US009969454B2

(12) United States Patent
Terada et al.

(10) Patent No.: US 9,969,454 B2
(45) Date of Patent: May 15, 2018

(54) VEHICLE

(71) Applicant: YAMAHA HATSUDOKI KABUSHIKI KAISHA, Itawa-shi, Shizuoka (JP)

(72) Inventors: Keisuke Terada, Shizuoka (JP); Takayuki Sano, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days. days.

(21) Appl. No.: 15/359,657

(22) Filed: Nov. 23, 2016

(65) Prior Publication Data
US 2017/0144719 A1    May 25, 2017

(30) Foreign Application Priority Data
Nov. 24, 2015   (JP) .................................. 2015-228798

(51) Int. Cl.
| B62K 5/10 | (2013.01) |
| B62K 5/08 | (2006.01) |
| B62K 11/04 | (2006.01) |
| B62J 25/00 | (2006.01) |
| B62K 3/00 | (2006.01) |
| B62K 5/027 | (2013.01) |
| B62K 5/05 | (2013.01) |
| B62K 5/00 | (2013.01) |

(52) U.S. Cl.
CPC .................. B62K 5/10 (2013.01); B62J 25/00 (2013.01); B62K 3/002 (2013.01); B62K 5/027 (2013.01); B62K 5/05 (2013.01); B62K 5/08 (2013.01); B62K 11/04 (2013.01); *B62K 2005/001* (2013.01); *B62K 2700/22* (2013.01)

(58) Field of Classification Search
CPC combination set(s) only.
See application file for complete search history.

(56) References Cited

U.S. PATENT DOCUMENTS

| 3,572,456 | A | * | 3/1971 | Healy | B62D 61/08 |
| | | | | | 180/217 |
| 4,020,914 | A | * | 5/1977 | Trautwein | B60G 21/007 |
| | | | | | 180/15 |
| 4,088,199 | A | * | 5/1978 | Trautwein | B60G 21/007 |
| | | | | | 180/209 |
| 4,375,293 | A | * | 3/1983 | Solbes | B62B 19/00 |
| | | | | | 280/124.127 |
| 4,697,663 | A | * | 10/1987 | Trautwein | B62H 1/02 |
| | | | | | 180/210 |

(Continued)

FOREIGN PATENT DOCUMENTS

| DE | 102010052716 B4 | * | 9/2012 | ............. B62K 5/027 |
| EP | 2889210 A1 | * | 7/2015 | ............. B62K 5/027 |

(Continued)

*Primary Examiner* — Nicole T Verley
(74) *Attorney, Agent, or Firm* — Keating and Bennett, LLP

(57) ABSTRACT

A load transmission includes a left foot placement surface on which a left foot of a driver riding the vehicle is to be placed and a right foot placement surface on which a right foot of the driver is to be placed. The load transmission transmits a load to a left portion of a linkage by way of the left foot placement surface, and transmits a load to a right portion of the linkage by way of the right foot placement surface.

11 Claims, 9 Drawing Sheets

(56) References Cited

U.S. PATENT DOCUMENTS

| | | | | |
|---|---|---|---|---|
| 4,740,004 | A * | 4/1988 | McMullen | B62K 5/05 |
| | | | | 280/124.103 |
| 4,863,183 | A * | 9/1989 | Hwang | B62K 5/05 |
| | | | | 180/210 |
| 4,903,857 | A * | 2/1990 | Klopfenstein | B62K 5/05 |
| | | | | 280/267 |
| 7,467,802 | B2 * | 12/2008 | Peng | B60G 21/007 |
| | | | | 280/124.103 |
| 7,487,985 | B1 * | 2/2009 | Mighell | B62K 5/027 |
| | | | | 180/210 |
| 7,600,596 | B2 * | 10/2009 | Van Den Brink | B62J 25/00 |
| | | | | 180/210 |
| 7,665,749 | B2 * | 2/2010 | Wilcox | B60G 3/01 |
| | | | | 280/124.103 |
| 9,238,482 | B2 * | 1/2016 | Huang | B62D 9/04 |
| 9,278,711 | B2 * | 3/2016 | Takano | B62K 5/05 |
| 9,340,249 | B2 * | 5/2016 | Takano | B62K 21/00 |
| 9,545,967 | B2 * | 1/2017 | Takano | B62K 21/00 |
| 9,731,786 | B2 * | 8/2017 | Yoshikuni | B60G 13/003 |
| 9,738,344 | B2 * | 8/2017 | Hirakawa | B62K 5/10 |
| 9,745,012 | B2 * | 8/2017 | Ohno | B62K 5/08 |
| 9,771,117 | B2 * | 9/2017 | Hirakawa | B62K 5/08 |
| 9,771,118 | B2 * | 9/2017 | Takano | B62K 5/10 |
| 9,776,680 | B2 * | 10/2017 | Hirakawa | B62K 5/10 |
| 9,840,300 | B2 * | 12/2017 | Ohno | B60G 17/0155 |
| 9,862,448 | B2 * | 1/2018 | Hirakawa | B62K 5/10 |
| 2005/0167174 | A1 | 8/2005 | Marcacci | |
| 2015/0232147 | A1 | 8/2015 | Hirayama et al. | |
| 2017/0210440 | A1 * | 7/2017 | Dragomir | B62K 15/008 |
| 2017/0313375 | A1 * | 11/2017 | Lee | B62K 5/10 |

FOREIGN PATENT DOCUMENTS

| | | |
|---|---|---|
| FR | 2.085.428 A1 | 12/1971 |
| JP | 2005-313876 A | 11/2005 |
| WO | 2014/053713 A1 | 4/2014 |

* cited by examiner

FIG. 1
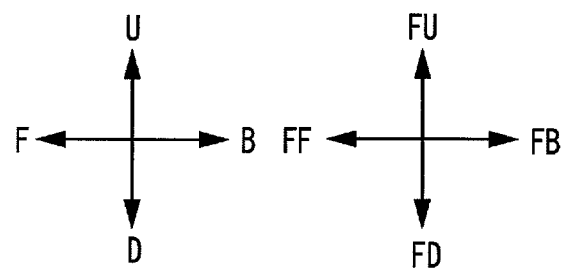
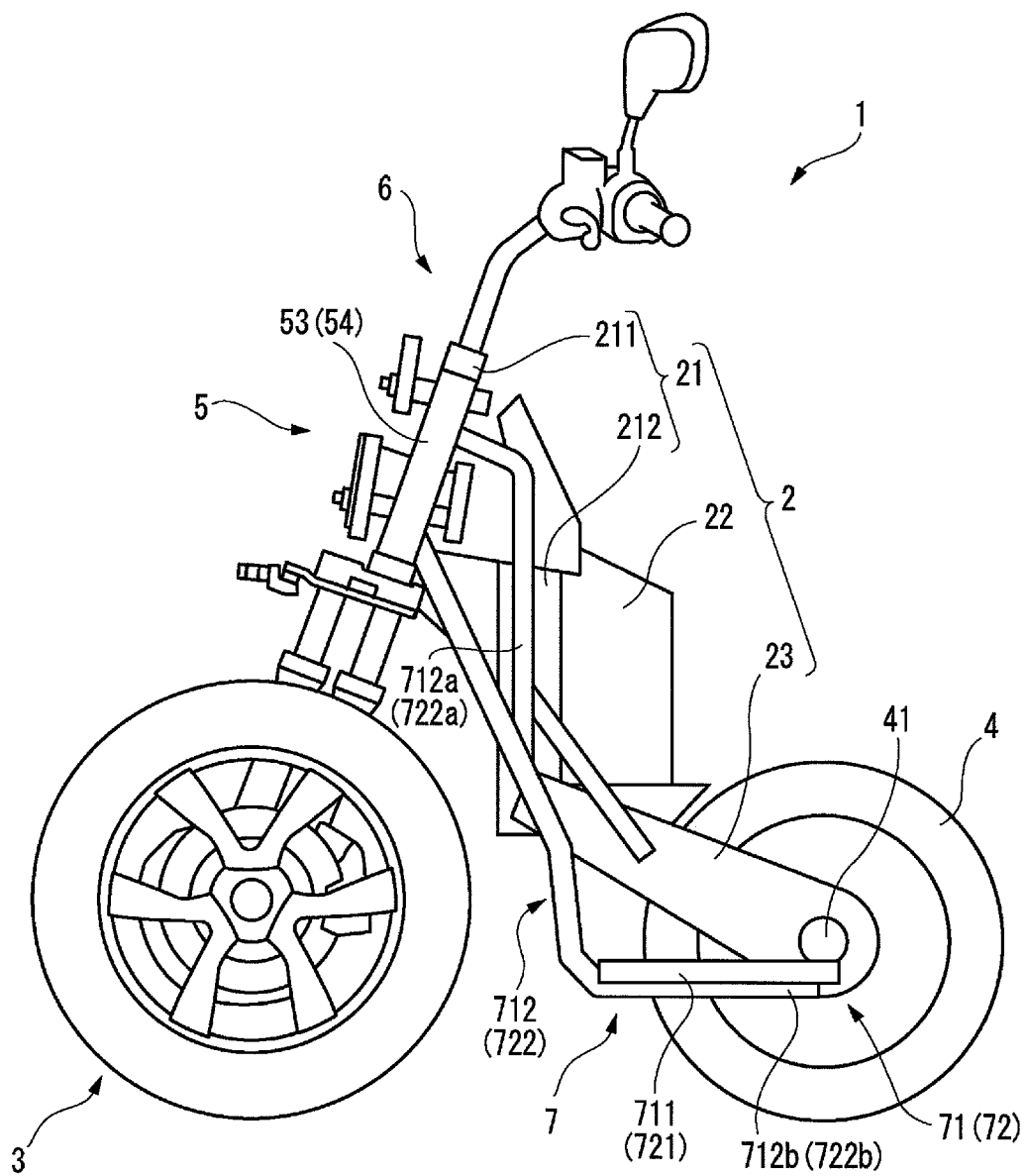

VEHICLE

CROSS REFERENCE TO RELATED APPLICATIONS

This application claims the benefit of priority to Japanese Patent Application No. 2015-228798 filed on Nov. 24, 2015. The entire contents of this application are hereby incorporated herein by reference.

BACKGROUND OF THE INVENTION

1. Field of the Invention

The present disclosure relates to a vehicle including a leanable body frame and two front wheels.

2. Description of the Related Art

A vehicle described in, for example, Japanese Patent Publication No. 2005-313876 A includes a body frame and two front wheels that are arranged side by side in a left-right direction of the body frame.

The vehicle includes a linkage. The linkage is disposed above the two front wheels. The linkage is configured to change positions of the two front wheels relative to the body frame to cause the body frame to lean to the left or right of the vehicle. In addition, the vehicle described above includes an anti-roll device in order to reduce the leaning of the body frame.

SUMMARY OF THE INVENTION

For a vehicle equipped with a leanable body frame and two front wheels, there is a need to reduce the leaning of the body frame with a simpler configuration.

Preferred embodiments of the present invention provide a vehicle including a body frame; a left front wheel and a right front wheel that are side by side in a left-right direction of the body frame; a linkage disposed above the left front wheel and the right front wheel in an up-down direction of the body frame, and including an upper cross member, a lower cross member, a left side member, and a right side member that are connected with each other such that the upper cross member and the lower cross member maintain their postures parallel to each other while the left side member and the right side member maintain their postures parallel to each other, and that changes positions of the left front wheel and the right front wheel relative to the body frame to cause the body frame to lean to left or right of the vehicle; a left front wheel support connected to the linkage and supporting the left front wheel; a right front wheel support connected to the linkage and supporting the right front wheel; and a load transmission including a left foot placement surface on which a left foot of a driver riding the vehicle is to be placed and a right foot placement surface on which a right foot of the driver is to be placed, that transmits a load to a left portion of the linkage by way of one of the left foot placement surface and the right foot placement surface, and that transmits a load to a right portion of the linkage by way of the other one of the left foot placement surface and the right foot placement surface.

It should be noted that the "left portion" of a member represents a portion that is located on the left of a center of that member in the left-right direction of the body frame. Similarly, the "right portion" of a member represents a portion that is located on the left of a center of that member in the left-right direction of the body frame.

According to the configuration described above, the leaning of the body frame is controlled by individually controlling the load applied to the left foot placement surface through the left foot of the rider and the load applied to the right foot placement surface through the right foot of the rider.

For example, when the body frame leans to the left of the vehicle, the left portion of the linkage including the left portion of the upper cross member, the left portion of the lower cross member, and the left side member is displaced to a position above the right portion of the linkage including the right portion of the upper cross member, the right portion of the lower cross member, and the right side member in the up-down direction of the body frame. As this occurs, when a load is applied to the left portion of the linkage through the left foot placement surface by the left foot of the rider, a force acts to displace the left portion of the linkage downwards, such that the leaning of the body frame to the left of the vehicle is reduced. On the contrary, when the body frame leans to the right of the vehicle, the right portion of the linkage is displaced to a position above the left portion of the linkage in the up-down direction of the body frame. As this occurs, when a load is applied to the right portion of the linkage through the right foot placement surface by the right foot of the rider, a force acts to displace the right portion of the linkage downwards in the up-down direction of the body frame, such that the leaning of the body frame to the right of the vehicle is reduced.

Since the load is applied directly to the linkage through the foot of the rider, the leaning of the vehicle is controlled without the necessity of providing a complicated mechanism such as an anti-rolling device described in Japanese Patent Publication No. 2005-313876 A. As a result, the leaning of the body frame of the vehicle equipped with the leanable body frame and the two front wheels is controlled with a simple configuration.

The above vehicle may further include a steering member provided so as to be turnable about a turning axis relative to the body frame; and a steering force transmission connecting the left front wheel support and the right front wheel support, and that causes the left front wheel and the right front wheel to turn in a direction that the steering member is turned. The load transmission includes a left foot placement portion including the left foot placement surface and located in such a portion of the left portion of the linkage that is able to be displaced relative to the body frame in accordance with leaning of the body frame but is not able to be displaced relative to the body frame in accordance with a steering motion of the steering force transmission; and a right foot placement portion including the right foot placement surface and located in such a portion of the right portion of the linkage that is able to be displaced relative to the body frame in accordance with leaning of the body frame but is not able to be displaced relative to the body frame in accordance with the steering motion of the steering force transmission.

According to the configuration described above, since the left foot placement surface and the right foot placement surface are located in such portions that are not able to be displaced relative to the body frame in accordance with the steering motion of the steering force transmission, they are not displaced in the direction in which the steering member turns when the vehicle is steered. In other words, the left foot placement surface and the right foot placement surface are able to move only in the up-down direction of the body frame and in the directions in which the body frame is caused to lean. Consequently, by providing a mechanism that controls the leaning of the body frame, the enlargement of the size of the vehicle is significantly reduced or prevented.

In this case, the above vehicle may be configured such that the upper cross member is connected to the body frame so as to be turnable about an upper intermediate connecting axis; the lower cross member is connected to the body frame so as to be turnable about a lower intermediate connecting axis; a left portion of the upper cross member is connected to an upper portion of the left side member so as to be turnable about an upper left connecting axis; a right portion of the upper cross member is connected to an upper portion of the right side member so as to be turnable about an upper right connecting axis; a left portion of the lower cross member is connected to a lower portion of the left side member so as to be turnable about a lower left connecting axis; a right portion of the lower cross member is connected to a lower portion of the right side member so as to be turnable about a lower right connecting axis; a portion of the lower cross member that is located directly above the lower intermediate connecting axis overlaps the upper cross member, as viewed from the front of the vehicle in the direction along the lower intermediate connecting axis; the left front wheel support is connected to the left side member so as to be turnable in accordance with the steering motion of the steering force transmission; the right front wheel support is connected to the right side member so as to be turnable in accordance with the steering motion of the steering force transmission; the left foot placement portion is located on the left side member; and the right foot placement portion is located on the right side member.

A moving range of each of the left side member and the right side member in the left-right direction of the body frame when the vehicle is caused to lean is less than a moving range in the up-down direction of the body frame thereof. Consequently, the enlargement of the moving range of each of the left foot placement surface and the right foot placement surface when the vehicle is caused to lean is reduced particularly in the left-right direction of the body frame. This advantageous effect becomes remarkable particularly in a case where the left foot placement surface and the right foot placement surface are located farther away from the turning center of the lower cross member.

As an example of such a case, the above vehicle may be configured such that a distance between the lower intermediate connecting axis and a lower end of the left foot placement surface is longer than a distance between the lower intermediate connecting axis and the lower left connecting axis, when the vehicle in which the body frame is in an upright state is viewed from the front in a direction along the lower intermediate connecting axis; and a distance between the lower intermediate connecting axis and a lower end of the right foot placement surface is longer than a distance between the lower intermediate connecting axis and the lower right connecting axis, when the vehicle in which the body frame is in an upright state is viewed from the front in the direction along the lower intermediate connecting axis.

In addition, the vehicle may be configured such that the left foot placement portion is integral with the left side member; and the right foot placement portion is integral with the right side member.

It should be noted that the expression "integrally with" means that two members are not displaced relative to each other at a portion that is joined by welding, fastening, or the like.

According to the configuration described above, the structure that controls the leaning of the body frame of the vehicle equipped with the leanable body frame and the two front wheels is simple.

Alternatively, the above vehicle may be configured such that the upper cross member is connected to the body frame so as to be turnable about the upper intermediate connecting axis; the lower cross member is connected to the body frame so as to be turnable about the lower intermediate connecting axis; the left foot placement portion includes an upper left connector connected to the left portion of the upper cross member so as to be turnable about an upper left turning axis extending in a direction parallel to the upper intermediate connecting axis; and a lower left connector connected to the left portion of the lower cross member so as to be turnable about a lower left turning axis extending in a direction parallel to the lower intermediate connecting axis. The right foot placement portion includes an upper right connector connected to the right portion of the upper cross member so as to be turnable about an upper right turning axis extending in the direction parallel to the upper intermediate connecting axis; and a lower right connector connected to the right portion of the lower cross member so as to be turnable about a lower right turning axis extending in the direction parallel to the lower intermediate connecting axis.

According to the configuration described above, when the vehicle is caused to lean, the left foot rest turns relative to the upper cross member and the lower cross member while maintaining its posture which is parallel or substantially parallel to the left side member. Although these members are necessary to achieve the turning operations, by disposing the upper left connector and the lower left connector on the right of the left side member in the left-right direction of the body frame, the enlargement of the moving range of the left foot placement surface when the vehicle is caused to lean is further reduced or prevented.

On the other hand, the right foot rest turns relative to the upper cross member and the lower cross member while maintaining its posture which is parallel or substantially parallel to a right side member. Although these members are used to achieve the turning operations, by disposing the upper right connector and the lower right connector on the left of the right side member in the left-right direction of the body frame, the enlargement of the moving range of the right foot placement surface when the vehicle is caused to lean is further reduced or prevented.

The above vehicle may be configured such that the left foot placement surface is disposed below the left side member in an up-down direction of the body frame; and the right foot placement surface is disposed below the right side member in the up-down direction of the body frame.

According to the configuration described above, the rider easily places his or her left foot and right foot on the left foot placement surface and the right foot placement surface, respectively. Thus, the rider is able to mount and dismount from the vehicle easily, as well as the rider is able to obtain a good operation feeling.

The above vehicle may be configured such that the left foot placement surface is disposed behind a rear end of the left front wheel in a front-rear direction of the body frame; and the right foot placement surface is disposed behind a rear end of the right front wheel in the front-rear direction of the body frame.

According to the configuration described above, when the vehicle is steered or is caused to lean, the interference of the left foot placement surface with the left front wheel is easily avoided, as well as the interference of the right foot placement surface with the right front wheel is also easily avoided.

In this case, the vehicle may further include a rear wheel, wherein a front end of the left foot placement surface is located in either one of a left front section and a left rear section, when the vehicle in which the body frame is in an upright state is viewed from the left in a left-right direction of the body frame. The left front section is defined by a left central line extending in an up-down direction of the body frame so as to include a left central point located at a center between an axle of the left front wheel and the rear wheel in the front-rear direction of the body frame; and a left front central line extending in the up-down direction of the body frame so as to include a left front central point located at a center between the left central point and the axle of the left front wheel in the front-rear direction of the body frame. The left rear section is defined by the left central line and a left rear central line extending in the up-down direction of the body frame so as to include a left rear central point located at a center between the left central point and the axle of the rear wheel in the front-rear direction of the body frame; and a front end of the right foot placement surface is located in either one of a right front section and a right rear section when the vehicle in which the body frame is in the upright state is viewed from the right in the left-right direction of the body frame. The right front section is defined by a right central line extending in the up-down direction of the body frame so as to include a right central point located at a center between an axle of the right front wheel and the rear wheel in the front-rear direction of the body frame; and a right front central line extending in the up-down direction of the body frame so as to include a right front central point located at a center between the right central point and the axle of the right front wheel in the front-rear direction of the body frame. The right rear section is defined by the right central line and a right rear central line extending in the up-down direction of the body frame so as to include a right rear central point located at a center between the right central point and the axle of the rear wheel in the front-rear direction of the body frame.

Since the vehicle includes two front wheels and the linkage, the center of gravity of the body is located relatively forward. In the event that the left foot placement surface and the right foot placement surface are respectively disposed ahead of the left front section and the right front section, the center of gravity of the body is located farther forward. On the other hand, in the event that the left foot placement surface and the right foot placement surface are respectively disposed behind the left rear section and the right rear section, loads applied through the left foot and the right foot of the rider are not easily transmitted to the linkage. According to the configuration described above, not only is the center of gravity of the vehicle in operation located in a proper position but also the loads are easily applied.

In addition, the above vehicle may further include a driving power source disposed behind the linkage in the front-rear direction of the body frame, and that supplies a driving power for the vehicle, wherein the left foot placement surface is disposed on the left of a left end of the driving power source in the left-right direction of the body frame; and the right foot placement surface is disposed on the right of a right end of the driving power source in the left-right direction of the body frame.

In order to transmit the loads applied through the left foot and the right foot of the rider to the linkage in an effective manner, the left foot placement surface and the right foot placement surface are preferably disposed so as to be spaced apart from each other in the left-right direction of the body frame. By disposing the driving power source having a relatively large volume in the space described above, it is possible to enhance the utilization efficiency of the space.

The above vehicle may be configured such that the left front wheel support includes a left shock absorber connected to the left portion of the linkage so as to be able to change a length thereof in an up-down direction of the body frame; and the right front wheel support includes a right shock absorber connected to the right portion of the linkage so as to be able to change a length thereof in the up-down direction of the body frame.

According to the configuration described above, since the left shock absorber is interposed between the left portion of the linkage where the left foot rest is provided and the left front wheel, it is possible to reduce the transmission of vibrations from the left front wheel to the left foot placement surface. Similarly, since the right shock absorber is interposed between the right portion of the linkage where the right foot placement surface is provided and the right front wheel, it is possible to reduce the transmission of vibrations from the right front wheel to the right foot placement surface. Consequently, the comfort in riding the vehicle is enhanced.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1 is a left side view entirely showing a vehicle according to a preferred embodiment of the present invention.

DETAILED DESCRIPTION OF THE PREFERRED EMBODIMENTS

Figure 2:
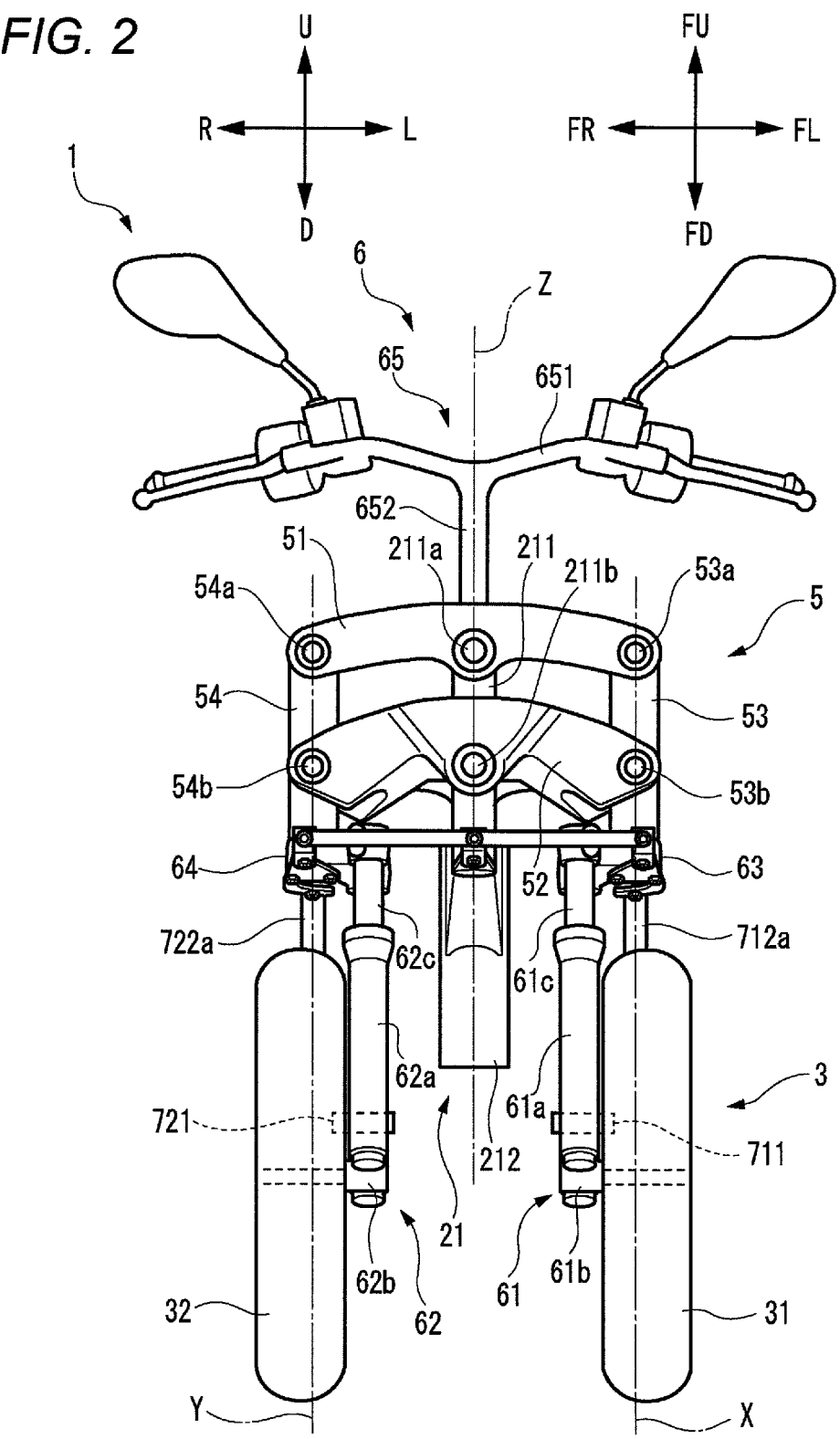
FIG. 2 is a front view showing a front portion of the vehicle of FIG. 1.

Referring to the accompanying drawings, preferred embodiments will be described in detail below.

In the accompanying drawings, an arrow F denotes a front or forward direction of a vehicle. An arrow B denotes a back/rear or backward/rearward direction of the vehicle. An arrow U denotes an up or upward direction of the vehicle. An arrow D denotes a down or downward direction of the vehicle. An arrow R denotes a right or rightward direction of the vehicle. An arrow L denotes a left or leftward direction of the vehicle.

A vehicle turns with a body frame being caused to lean to the left or right of the vehicle from a vertical direction. In addition to the directions based on the vehicle, directions based on the body frame will be defined. In the accompanying drawings, an arrow FF denotes a front or forward direction of the body frame. An arrow FB denotes a back/rear or backward/rearward of the body frame. An arrow FU denotes an up or upward direction of the body frame. An arrow FD denotes a down or downward direction of the body frame. An arrow FR denotes a right or rightward direction of the body frame. An arrow FL denotes a left or leftward direction of the body frame.

In this description, a "front-rear direction of the body frame," a "left-right direction of the body frame" and an "up-down direction of the body frame" mean a front-rear direction, a left-right direction and an up-down direction based on the body frame when viewed from a rider who rides the vehicle. "A side of or sideways of the body frame" means directly on the right or left in the left-right direction of the body frame.

In this description, an expression "extending in the front-rear direction of the vehicle body frame" includes being inclined in relation to the front-rear direction of the vehicle body frame and means that it extends in a direction closer to the front-rear direction of the vehicle body frame than the left-right direction and up-down direction of the vehicle body frame.

In this description, an expression "extending in the left-right direction of the vehicle body frame" includes being inclined in relation to the left-right direction of the vehicle body frame and means that it extends in a direction closer to the left-right direction of the vehicle body frame than the front-rear direction and up-down direction of the vehicle body frame.

In this description, an expression "extending in the up-down direction of the vehicle body frame" includes being inclined in relation to the up-down direction of the vehicle body frame and means that it extends in a direction closer to the up-down direction of the vehicle body frame than the left-right direction and front-rear direction of the vehicle body frame.

In this description, an expression reading the "vehicle is standing upright or in an upright state" or the "body frame is standing upright or in the upright state" includes a state in which the vehicle is not steered at all and the up-down direction of the body frame coincides with the vertical direction. In this state, the directions based on the vehicle coincide with the directions based on the body frame. When the vehicle is turning with the body frame caused to lean to the left or right from the vertical direction, the left-right direction of the vehicle does not coincide with the left-right direction of the body frame. Similarly, the up-down direction of the vehicle does not coincide with the up-down direction of the body frame. However, the front-rear direction of the vehicle coincides with the front-rear direction of the body frame.

In this description, an expression reading "directly on the left of a member A in the left-right direction of the body frame" denotes a space through which the member A passes when the member A is translated to the left in the left-right direction of the body frame. An expression reading "directly on the right of the member A" is also defined in the same way.

In this description, an expression reading "on the left of the member A in the left-right direction of the body frame" includes not only the space through which the member A passes when the member A is translated to the left in the left-right direction of the body frame but also a space which expands from the space in directions which are at right angles to the left-right direction of the body frame. An expression reading "on the right of the member A" is also defined in the same way.

In this description, an expression reading "directly above the member A in the up-down direction of the body frame" denotes a space through which the member A passes when the member A is translated upwards in the up-down direction of the body frame. An expression reading "directly below the member A" is also defined in the same way.

In this description, an expression reading "above the member A in the up-down direction of the body frame" includes not only the space through which the member A passes when the member A is translated upwards in the up-down direction of the body frame but also a space which expands from the space in directions which are at right angles to the up-down direction of the body frame. An expression reading "below the member A" is also defined in the same way.

In this description, an expression reading "directly ahead of the member A in the front-rear direction of the body frame" denotes a space through which the member A passes when the member A is translated to the front in the front-rear direction of the body frame. An expression reading "directly behind the member A" is also defined in the same way.

In this description, an expression reading "ahead of the member A in the front-rear direction of the body frame" includes not only the space through which the member A passes when the member A is translated to the front in the front-rear direction of the body frame but also a space which expands from the space in directions which are at right angles to the front-rear direction of the body frame. An expression reading "behind the member A" is also defined in the same way.

In this description, "rotation, rotating or rotated" means that a member is displaced at an angle of 360 degrees or more about an axis thereof. In this description, "turn, turning or turned" means that a member is displaced at an angle less than 360 degrees about an axis thereof.

Referring to FIGS. 1 to 7, a vehicle 1 according to preferred embodiments of the present invention will be described. The vehicle 1 is a vehicle that includes a leanable body frame and two front wheels that are arranged side by side in a left-right direction of the body frame.

As shown in FIG. 1, the vehicle 1 includes a vehicle main body 2, two front wheels 3, a rear wheel 4, a linkage 5 and a steering mechanism 6.

The vehicle main body 2 includes a body frame 21, a power unit 22, and a rear arm 23. In FIG. 1, the body frame 21 is in an upright state. The following description to be made with reference to FIG. 1 is based on the premise that the body frame 21 is in the upright state. FIG. 1 is a left side view resulting when the entire vehicle 1 is viewed from the left in the left-right direction of the body frame 21.

The body frame 21 includes a head pipe 211 and a main frame 212. The body frame 21 supports the power unit 22.

The head pipe 211 is disposed at a front portion of the vehicle 1. When viewing the vehicle 1 from the left in the left-right direction of the body frame 21, an upper portion of the head pipe 211 is disposed behind a lower portion of the head pipe 211 in the front-rear direction of the body frame 21.

The main frame 212 is connected to the head pipe 211. The main frame 212 is disposed behind the head pipe 211 in the front-rear direction of the body frame 21. The main frame 212 supports the power unit 22 and the rear arm 23.

The rear arm 23 is disposed behind the main frame 212 in the front-rear direction of the body frame 21. The rear arm 23 extends in the front-rear direction of the body frame 21. A front end portion of the rear arm 23 is supported on the main frame 212 and is able to turn about an axis that extends in the left-right direction of the body frame 21. A rear end portion of the rear arm 23 supports the rear wheel 4.

The two front wheels 3 are disposed below the head pipe 211 in an up-down direction of the body frame 21. The rear wheel 4 is disposed behind the two front wheels 3 in the front-rear direction of the body frame 21.

The power unit 22 (an example of a driving power source) generates power which drives the vehicle 1. When viewing the vehicle 1 in the left-right direction of the body frame 21, the power unit 22 is located ahead of an axle shaft 41 of the rear wheel 4 in the front-rear direction of the body frame 21. The power unit 22 is not displaced relative to the body frame 21. The power unit 22 is not to displaced relative to the main frame 212. The power unit 22 includes an engine. Driving power generated by the engine is transmitted to the rear wheel 4 through a transmission.

FIG. 2 is a front view of the front portion of the vehicle 1 as viewed from the front in the front-rear direction of the body frame 21. In FIG. 2, the body frame 21 is in the upright state. The following description to be made with reference to FIG. 2 is based on the premise that the body frame 21 is in the upright state. In FIG. 2, a portion of the vehicle main body 2 and the rear wheel 4 are omitted from illustration.

The two front wheels 3 include a left front wheel 31 and a right front wheel 32. The left front wheel 31 is disposed on the left of the head pipe 211 which is a portion of the body frame 21 in the left-right direction of the body frame 21. The right front wheel 32 is disposed on the right of the head pipe 211 in the left-right direction of the body frame 21. The left front wheel 31 and the right front wheel 32 are arranged side by side in the left-right direction of the body frame 21.

The steering mechanism 6 includes a left shock absorber 61, a right shock absorber 62, a left bracket 63 and a right bracket 64.

The left shock absorber 61 includes a left lower portion 61a. The left lower portion 61a supports the left front wheel 31. The left lower portion 61a extends in the up-down direction of the body frame 21. The left lower portion 61a includes a left support 61b at a lower end portion thereof. The left front wheel 31 is supported on the left support 61b.

The left shock absorber 61 includes a left upper portion 61c. The left upper portion 61c extends in the up-down direction of the body frame 21. The left upper portion 61c is disposed directly above the left lower portion 61a in the up-down direction of the body frame 21 while being partially inserted in the left lower portion 61a. An upper portion of the left upper portion 61c is fixed to the left bracket 63. The left shock absorber 61 and the left bracket 63 define a left front wheel support.

The left shock absorber 61 is preferably a so-called telescopic shock absorber. The left upper portion 61c moves relative to the left lower portion 61a in a direction in which the left lower portion 61a extends, such that the left shock absorber 61 is able to extend and contract in the extending direction of the left lower portion 61a. This enables the left shock absorber 61 to absorb a displacement of the left front wheels 31 relative to the left upper portion 61c in the up-down direction of the body frame 21.

The right shock absorber 62 includes a right lower portion 62a. The right lower portion 62a supports the right front wheel 32. The right lower portion 62a extends in the up-down direction of the body frame 21. The right lower portion 62a includes a right support 62b at a lower end portion thereof. The right front wheel 32 is supported on the right support 62b.

The right shock absorber 62 includes a right upper portion 62c. The right upper portion 62c extends in the up-down direction of the body frame 21. The right upper portion 62c is disposed directly above the right lower portion 62a in the up-down direction of the body frame 21 while being partially inserted in the right lower portion 62a. An upper portion of the right upper portion 62c is fixed to the right bracket 64. The right shock absorber 62 and the right bracket 64 define a right front wheel support.

The right shock absorber 62 is preferably a so-called telescopic shock absorber. The right upper portion 62c moves relative to the right lower portion 62a in a direction in which the right lower portion 62a extends, such that the right shock absorber 62 is able to extend and contract in the extending direction of the right lower portion 62a. This enables the right shock absorber 62 to absorb a displacement of the right front wheels 32 relative to the right upper portion 62c in the up-down direction of the body frame 21.

The steering mechanism 6 includes a steering member 65. The steering member 65 includes a handlebar 651 and a steering shaft 652. The handlebar 651 is attached to an upper portion of the steering shaft 652. A portion of a steering shaft 652 is turnably supported on the head pipe 211. An intermediate steering axis Z of the steering shaft 652 extends in the up-down direction of the body frame 21. As shown in FIG. 1, the upper portion of the steering shaft 652 is disposed behind a lower portion thereof in the front-rear direction of the body frame 21. Consequently, the intermediate steering axis Z of the steering shaft 652 is inclined in the front-rear direction of the body frame 21. The steering shaft 652 turns about the intermediate steering axis Z as a rider operates the handlebar 651.

In the vehicle 1 according to the present preferred embodiment, the linkage 5 preferably uses a four parallel joint link system (also referred to as a parallelogram link).

As shown in FIG. 2, the linkage 5 is disposed below the handlebar 651 in the up-down direction of the body frame 21. The linkage 5 is disposed above the left front wheel 31 and the right front wheel 32 in the up-down direction of the body frame 21. The linkage 5 includes an upper cross member 51, a lower cross member 52, a left side member 53 and a right side member 54. The linkage 5 is not interlocked with the turning of the steering shaft 652 about the intermediate steering axis Z associated with the operation of the handlebar 651. Namely, the linkage 5 does not turn about the intermediate steering axis Z relative to the body frame 21.

The head pipe 211 includes an upper intermediate connector 211a. An intermediate portion of the upper cross member 51 is connected to the head pipe 211 by way of the upper intermediate connector 211a. The upper cross member 51 is able to turn relative to the head pipe 211 about an upper intermediate connecting axis which passes through the upper intermediate connector 211a to extend in the front-rear direction of the body frame 21.

The left side member 53 includes an upper left connector 53a. A left end portion of the upper cross member 51 is connected to the left side member 53 by way of the upper left connector 53a. The upper cross member 51 is able to turn relative to the left side member 53 about an upper left connecting axis which passes through the upper left connector 53a to extend in the front-rear direction of the body frame 21.

The right side member 54 includes an upper right connector 54a. A right end portion of the upper cross member 51 is connected to the right side member 54 by way of the upper right connector 54a. The upper cross member 51 is able to turn relative to the right side member 54 about an upper right connecting axis which passes through the upper right connector 54*a* to extend in the front-rear direction of the body frame 21.

The head pipe 211 includes a lower intermediate connector 211*b*. An intermediate portion of the lower cross member 52 is connected to the head pipe 211 by way of the lower intermediate connector 211*b*. The lower cross member 52 is able to turn relative to the head pipe 211 about a lower intermediate connecting axis which passes through the lower intermediate connector 211*b* to extend in the front-rear direction of the body frame 21.

The left side member 53 includes a lower left connector 53*b*. A left end portion of the lower cross member 52 is connected to the left side member 53 by way of the lower left connector 53*b*. The lower cross member 52 is able to turn relative to the left side member 53 about a lower left connecting axis which passes through the lower left connector 53*b* to extend in the front-rear direction of the body frame 21.

The right side member 54 includes a lower right connector 54*b*. A right end portion of the lower cross member 52 is connected to the right side member 54 by way of the lower right connector 54*b*. The lower cross member 52 is able to turn relative to the right side member 54 about a lower right connecting axis which passes through the lower right connector 54*b* to extend in the front-rear direction of the body frame 21.

The upper intermediate connecting axis, the upper right connecting axis, the upper left connecting axis, the lower intermediate connecting axis, the lower right connecting axis and the lower left connecting axis extend parallel to one another. The upper intermediate connecting axis, the upper right connecting axis, the upper left connecting axis, the lower intermediate connecting axis, the lower right connecting axis and the lower left connecting axis are disposed above the left front wheel 31 and the right front wheel 32 in the up-down direction of the body frame 21.

Figure 3:
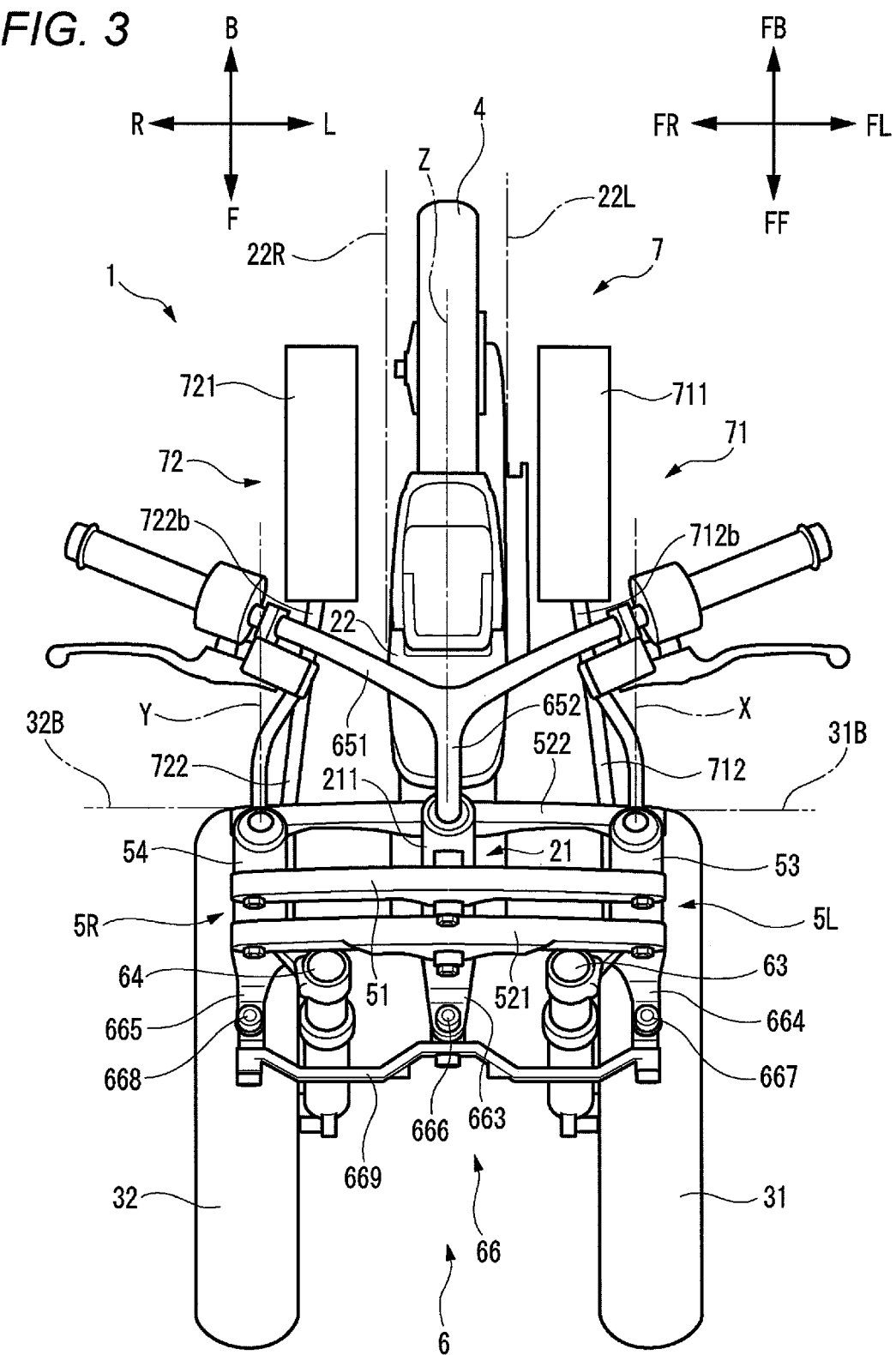
FIG. 3 is a plan view showing the front portion of the vehicle of FIG. 1.

FIG. 3 is a plan view of the front portion of the vehicle 1 as viewed from above in the up-down direction of the body frame 21. In FIG. 3, the body frame 21 is in the upright state. The following description to be made with reference to FIG. 3 will be based on the premise that the body frame 21 is in the upright state.

The upper cross member 51 is disposed ahead of the head pipe 211 in the front-rear direction of the body frame 21. The upper cross member 51 extends in the left-right direction of the body frame 21.

The lower cross member 52 includes a front element 521 and a rear element 522. The front element 521 is disposed ahead of the head pipe 211 in the front-rear direction of the body frame 21. The rear element 522 is disposed behind the head pipe 211 in the front-rear direction of the body frame 21. The front element 521 and the rear element 522 extend in the left-right direction of the body frame 21. The lower cross member 52 is disposed below the upper cross member 51 in the up-down direction of the body frame 21.

As shown in FIGS. 2 and 3, the left side member 53 is disposed directly on the left of the head pipe 211 in the left-right direction of the body frame 21. The left side member 53 is disposed above the left front wheel 31 in the up-down direction of the body frame 21. The left side member 53 extends in a direction in which the head pipe 211 extends. The left side member 53 extends in a direction in which the intermediate steering axis Z of the steering shaft 652 extends. An upper portion of the left side member 53 is disposed behind a lower portion thereof in the front-rear direction of the body frame 21.

The left bracket 63 includes a left turning member, not shown, at an upper portion thereof. The left turning member is disposed in an interior of the left side member 53 and extends in the same orientation as the direction in which the left side member 53 extends. The left turning member is able to turn about a left steering axis X relative to the left side member 53. Namely, the left bracket 63 is able to turn about the left steering axis X relative to the left side member 53. The left steering axis X extends in the direction in which the left side member 53 extends. As shown in FIG. 2, the left steering axis X extends parallel to the intermediate steering axis Z of the steering shaft 652 in the up-down direction of the body frame 21. As shown in FIG. 3, the left steering axis X extends parallel to the intermediate steering axis Z of the steering shaft 652 in the front-rear direction of the body frame 21.

As shown in FIGS. 2 and 3, the right side member 54 is disposed directly on the right of the head pipe 211 in the left-right direction of the body frame 21. The right side member 54 is disposed above the right front wheel 32 in the up-down direction of the body frame 21. The right side member 54 extends in the direction in which the head pipe 211 extends. The right side member 54 extends in the direction in which the intermediate steering axis Z of the steering shaft 652 extends. An upper portion of the right side member 54 is disposed behind a lower portion thereof in the front-rear direction of the body frame 21.

The right bracket 64 includes a right turning member, not shown, at an upper portion thereof. The right turning member is disposed in an interior of the right side member 54 and extends in the same orientation as the direction in which the right side member 54 extends. The right turning member is able to turn about a right steering axis Y relative to the right side member 54. Namely, the right bracket 64 is able to turn about the right steering axis Y relative to the right side member 54. The right steering axis Y extends in the direction in which the right side member 54 extends. As shown in FIG. 2, the right steering axis Y extends parallel to the intermediate steering axis Z of the steering shaft 652 in the up-down direction of the body frame 21. As shown in FIG. 3, the right steering axis Y extends parallel to the intermediate steering axis Z of the steering shaft 652 in the front-rear direction of the body frame 21.

Thus, as has been described above, the upper cross member 51, the lower cross member 52, the left side member 53 and the right side member 54 are supported on the body frame 21 so that the upper cross member 51 and the lower cross member 52 are held in postures which are parallel to each other while the left side member 53 and the right side member 54 are held in postures which are parallel to each other.

The steering mechanism 6 includes a steering force transmission 66. The steering force transmission 66 transmits a steering force with which the rider operates the handlebar 651 to the left bracket 63 and the right bracket 64. As shown in FIG. 3, the steering force transmission 66 includes an intermediate transmission plate 663, a left transmission plate 664, a right transmission plate 665, an intermediate joint 666, a left joint 667, a right joint 668, and a tie rod 669.

The intermediate transmission plate 663 is connected to a lower portion of the steering shaft 652. The intermediate transmission plate 663 cannot turn relative to the steering shaft 652. The intermediate transmission plate 663 is able to turn about the intermediate steering axis Z of the steering shaft 652 relative to the head pipe 211.

The left transmission plate 664 is disposed directly on the left of the intermediate transmission plate 663. The left transmission plate 664 is connected to a lower portion of the left bracket 63. The left transmission plate 664 cannot turn relative to the left bracket 63. The left transmission plate 664 is able to turn about the left steering axis X relative to the left side member 53.

The right transmission plate 665 is disposed directly on the right of the intermediate transmission plate 663 in the left-right direction of the body frame 21. The right transmission plate 665 is connected to a lower portion of the right bracket 64. The right transmission plate 665 cannot turn relative to the right bracket 64. The right transmission plate 665 is able to turn about the right steering axis Y relative to the right side member 54.

As shown in FIG. 3, the intermediate joint 666 is connected to a front portion of the intermediate transmission plate 663 by way of a shaft which extends in the up-down direction of the body frame 21. The intermediate transmission plate 663 and the intermediate joint 666 are able to turn relative to each other about this shaft. The left joint 667 is disposed on the left of the intermediate joint 666 in the left-right direction of the body frame 21. The left joint 667 is connected to a front portion of the left transmission plate 664 by way of a shaft which extends in the up-down direction of the body frame 21. The left transmission plate 664 and the left joint 667 are able to turn relative to each other about this shaft. The right joint 668 is disposed on the right of the intermediate joint 666 in the left-right direction of the body frame 21. The right joint 668 is connected to a front portion of the right transmission plate 665 by way of a shaft which extends in the up-down direction of the body frame. The right transmission plate 665 and the right joint 668 are able to turn relative to each other about this shaft.

A shaft which extends in the front-rear direction of the body frame 21 is provided at a front portion of the intermediate joint 666. A shaft which extends in the front-rear direction of the body frame 21 is provided at a front portion of the left joint 667. A shaft which extends in the front-rear direction of the body frame 21 is provided at a front portion of the right joint 668. The tie rod 669 extends in the left-right direction of the body frame 21. The tie rod 669 is connected to the intermediate joint 666, the left joint 667 and the right joint 668 by way of those shafts. The tie rod 669 and the intermediate joint 666 are able to turn relative to each other about the shaft which is provided at the front portion of the intermediate joint 666. The tie rod 669 and the left joint 667 are able to turn relative to each other about the shaft which is provided at the front portion of the left joint 667. The tie rod 669 and the right joint 668 are able to turn relative to each other about the shaft which is provided at the front portion of the right joint 668.

The left transmission plate 664 is connected to the intermediate transmission plate 663 by way of the left joint 667, the tie rod 669, and the intermediate joint 666. The right transmission plate 665 is connected to the intermediate transmission plate 663 by way of the right joint 668, the tie rod 669 and the intermediate joint 666. The left transmission plate 664 and the right transmission plate 665 are connected to each other by way of the left joint 667, the tie rod 669 and the right joint 668.

Figure 4:
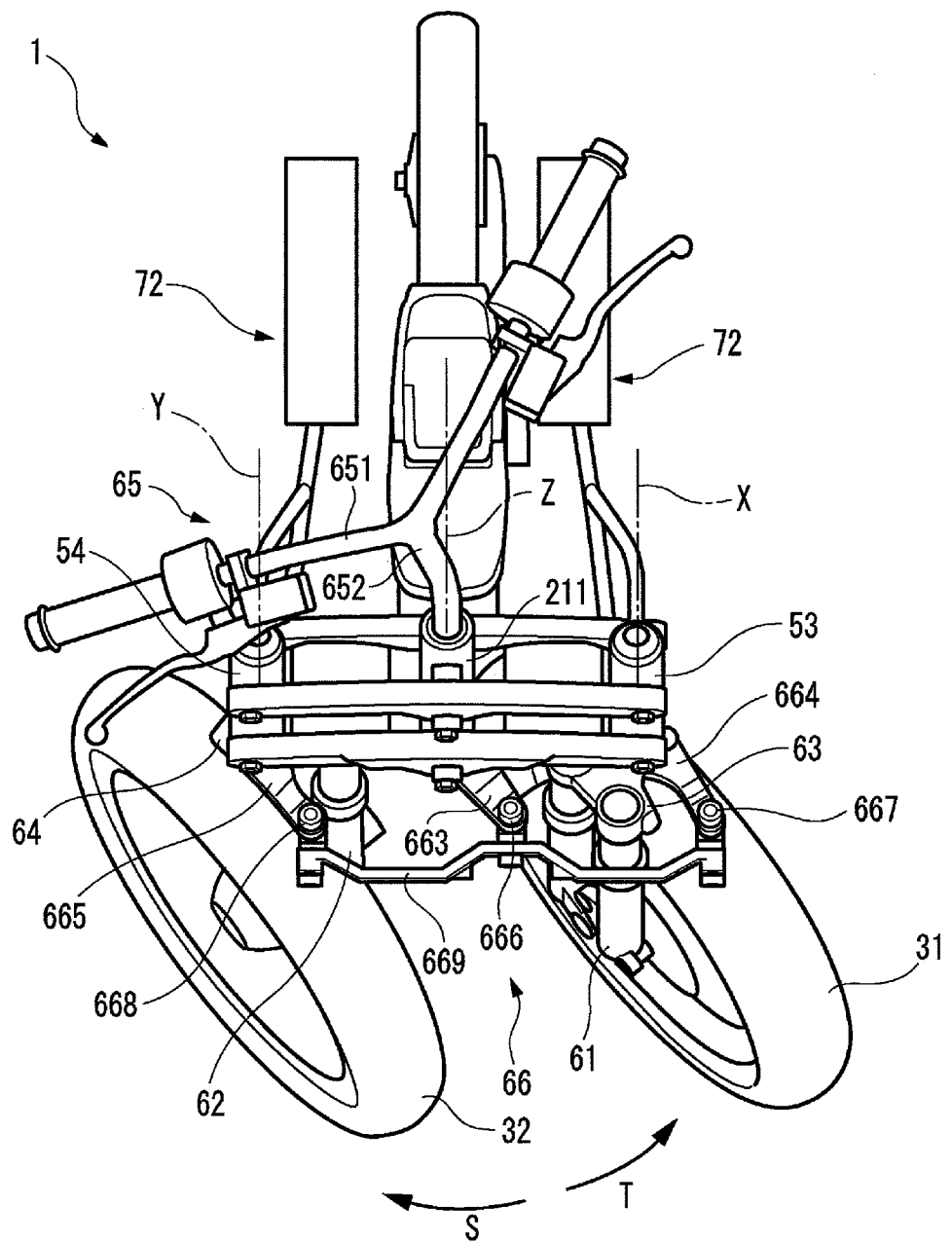
FIG. 4 is a plan view showing the front portion of the vehicle of FIG. 1 during steering.

Next, referring to FIGS. 3 and 4, a steering operation of the vehicle 1 will be described. FIG. 4 is a plan view of the front portion of the vehicle 1 viewed from above in the up-down direction of the body frame 21 when the left front wheel 31 and the right front wheel 32 are steered to the left.

When the handlebar 651 is operated by the rider, the steering shaft 652 is turned about the intermediate steering axis Z relative to the head pipe 211. In the case shown in FIG. 4 where the front wheels are turned to the left, the steering shaft 652 turns in a direction indicated by an arrow T. In association with the turn of the steering shaft 652, the intermediate transmission plate 663 turns in the direction indicated by the arrow T about the intermediate steering axis Z relative to the head pipe 211.

In association with the turning of the intermediate transmission plate 663 in the direction indicated by the arrow T, the intermediate joint 666 of the tie rod 669 turns relative to the intermediate transmission plate 663 in a direction indicated by an arrow S. This causes the tie rod 669 to move to the left in the left-right direction of the body frame 21 and to the rear in the front-rear direction of the body frame 21 while maintaining its posture.

In association with the movement of the tie rod 669, the left joint 667 and the right joint 668 of the tie rod 669 turn in the direction indicated by the arrow S relative to the left transmission plate 664 and the right transmission plate 665, respectively. This turns the left transmission plate 664 and the right transmission plate 665 in the direction indicated by the arrow T while allowing the tie rod 669 to maintain its posture.

When the left transmission plate 664 turns in the direction indicated by the arrow T, the left bracket 63, which is not able to turn relative to the left transmission plate 664, turns in the direction indicated by the arrow T about the left steering axis X relative to the left side member 53.

When the right transmission plate 665 is turned in the direction indicated by the arrow T, the right bracket 64, which is not able to turn relative to the right transmission plate 665, turns in the direction indicated by the arrow T about the right steering axis Y relative to the right side member 54.

When the left bracket 63 is turned in the direction of the arrow T, the left shock absorber 61, which is supported by the left bracket 63, turns in the direction of the arrow T about the left steering axis X relative to the left side member 53. When the left shock absorber 61 turns in the direction of the arrow T, the left front wheel 31, which is supported on the left shock absorber 61 by way of the left support 61b, turns in the direction of the arrow T about the left steering axis X relative to the left side member 53.

When the right bracket 64 is turned in the direction of the arrow T, the right shock absorber 62, which is supported by the right bracket 64, turns in the direction of the arrow T about the right steering axis Y relative to the right side member 54. When the right shock absorber 62 is turned in the direction of the arrow T, the right front wheel 32, which is supported on the right shock absorber 62 by way of the right support 62b, turns in the direction of the arrow T about the right steering axis Y relative to the right side member 54.

When the rider operates the handlebar 651 so as to steer to the right, the elements described above turn in opposite directions to the directions in which they turn when the vehicle turns to the left. Since the elements merely move the other way around in relation to the left-right direction, the detailed description thereof will be omitted here.

Namely, the steering force transmission 66 connects the left front wheel support and the right front wheel support together so that when the steering member 65 is operated to turn in the direction of the arrow T or S, the left front wheel 31 and the right front wheel 32 are turned in the direction that the steering member 65 turns.

Figure 5:
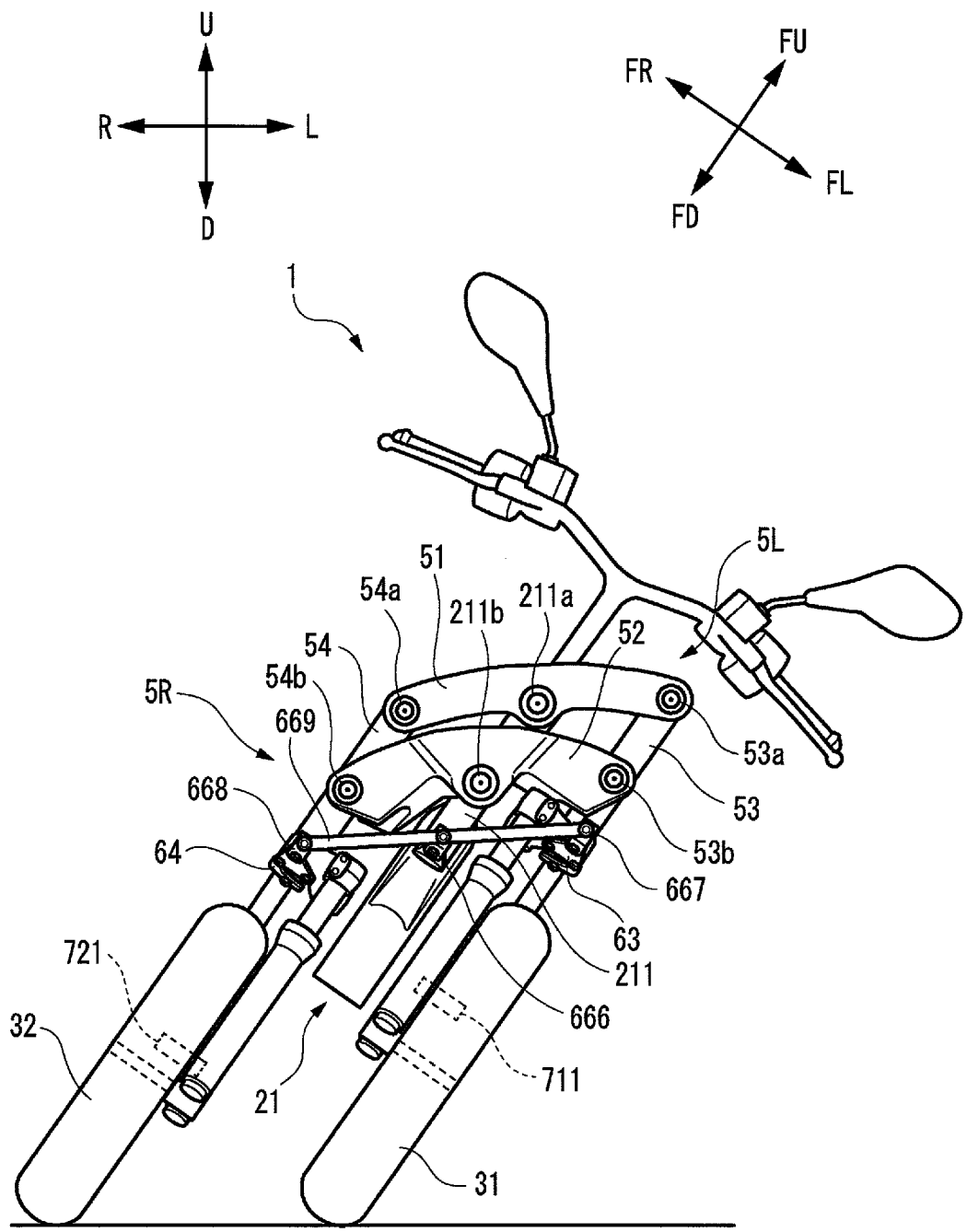
FIG. 5 is a front view showing the front portion of the vehicle of FIG. 1 during leaning.

Next, referring to FIGS. 2 and 5, a leaning operation of the vehicle 1 will be described. FIG. 5 is a front view of the front portion of the vehicle 1 as viewed from the front in the front-rear direction of the body frame 21 when the body frame 21 leans to the left of the vehicle 1. In FIG. 5, a portion of the vehicle main body 2 and the rear wheel 4 are omitted from illustration.

As shown in FIG. 2, when the vehicle 1 is viewed from the front of the body frame 21 when the body frame 21 is in an upright state, the linkage 5 has a rectangular or substantially rectangular shape. As shown in FIG. 5, when the vehicle 1 is viewed from the front of the body frame 21 when the body frame 21 leans, the linkage 5 has a parallelogram shape. The operation of the linkage 5 is interlocked with the leaning of the body frame 21 in the left-right direction. The operation of the linkage 5 means that the upper cross member 51, the lower cross member 52, the left side member 53 and the right side member 54 which define the linkage 5 turn relative to one another about the turning axes which pass the upper intermediate connector 211*a*, the upper left connector 53*a*, the upper right connector 54*a*, the lower intermediate connector 211*b*, the lower left connector 53*b* and the lower right connector 54*b*, respectively, such that the shape of the linkage 5 changes.

For example, as shown in FIG. 5, when the rider causes the vehicle 1 to lean to the left, the head pipe 211 leans to the left from the vertical direction. When the head pipe 211 is caused to lean, the upper cross member 51 is turned counterclockwise about the upper intermediate connecting axis which passes through the upper intermediate connector 211*a* relative to the head pipe 211 when viewed from the front of the vehicle 1. Similarly, the lower cross member 52 is turned counterclockwise about the lower intermediate connecting axis which passes through the lower intermediate connector 211*b* relative to the head pipe 211 when viewed from the front of the vehicle 1. This causes the upper cross member 51 to move to the left in the left-right direction of the body frame 21 relative to the lower cross member 52.

By moving in the way described above, the upper cross member 51 is turned counterclockwise about the upper left connecting axis which passes through the upper left connector 53*a* and the upper right connecting axis which passes through the upper right connector 54*a* relative to the left side member 53 and the right side member 54, respectively, when viewed from the front of the vehicle 1. Similarly, the lower cross member 52 is turned counterclockwise about the lower left connecting axis which passes through the lower left connector 53*b* and the lower right connecting axis which passes through the lower right connector 54*b* relative to the left side member 53 and the right side member 54, respectively, when viewed from the front of the vehicle 1. This causes the left side member 53 and the right side member 54 to lean to the left of the vehicle 1 from the vertical direction while holding their postures parallel to the head pipe 211.

As this occurs, the lower cross member 52 moves to the left in the left-right direction of the body frame 21 relative to the tie rod 669. As a result of the lower cross member 52 moving in the way described above, the shafts that are provided at the respective front portions of the intermediate joint 666, the left joint 667 and the right joint 668 turn relative to the tie rod 669. This allows the tie rod 669 to hold a posture that is parallel to the upper cross member 51 and the lower cross member 52.

As the left side member 53 leans to the left of the vehicle 1, the left bracket 63 which is supported on the left side member 53 by way of the left turning member leans to the left of the vehicle 1. As the left bracket 63 so leans, the left shock absorber 61 which is supported by the left bracket 63 also leans to the left of the vehicle 1. As the left shock absorber 61 leans, the left front wheel 31 which is supported on the left shock absorber 61 leans to the left of the vehicle 1 while maintaining its posture which is parallel to the head pipe 211.

As the right side member 54 leans to the left of the vehicle 1, the right bracket 64 which is supported on the right side member 54 by way of the right turning member leans to the left of the vehicle 1. As the right bracket 64 leans, the right shock absorber 62 which is supported by the right bracket 64 also leans to the left of the vehicle 1. As the right shock absorber 64 leans, the right front wheel 32 which is supported on the right shock absorber 62 leans to the left of the vehicle 1 while maintaining its posture which is parallel to the head pipe 211.

The description of the leaning operations of the left front wheel 31 and the right front wheel 32 is made relative to the vertical direction as a reference. However, during the leaning operation of the vehicle 1 (during the operation of the linkage 5), the up-down direction of the body frame 21 does not coincide with the vertical direction. In a case where the up-down direction of the body frame 21 is set as the reference, when the linkage 5 is operated, the left front wheel 31 and the right front wheel 32 change their relative position in the up-down direction of the body frame 21. In other words, the linkage 5 changes the relative position of the left front wheel 31 and the right front wheel 32 in the up-down direction of the body frame 21 to cause the body frame 21 to lean to the left or right of the vehicle 1 from the vertical direction.

When the rider causes the vehicle 1 to lean to the right, the elements lean to the right. Since the elements merely move the other way around in relation to the left-right direction, the detailed description thereof will be omitted here.

As shown in FIGS. 1 and 3, the vehicle 1 includes a load transmission 7. The load transmission 7 includes a left foot rest 71 and a right foot rest 72. The left foot rest 71 includes a left foot placement surface 711 and a left connector 712. The right foot rest 72 includes a right foot placement surface 721 and a right connector 722. The configuration of the right foot rest 72 is symmetrical with the configuration of the left foot rest 71 when the vehicle 1 is viewed from the left in the left-right direction of the body frame 21. Thus, the illustration of the right foot rest 72 is omitted, and only reference numerals related thereto will be shown in FIG. 1.

The left foot placement surface 711 is a portion where the left foot of the rider who rides on the vehicle 1 is placed. The left connector 712 connects the left foot placement surface 711 and the left side member 53 of the linkage 5 together. As shown in FIG. 1, the left connector 712 includes a left front portion 712*a* which extends in the up-down direction of the body frame 21 and a left rear portion 712*b* which extends in the front-rear direction of the body frame. The left front portion 712*a* is joined to the left side member 53. The left rear portion 712*b* is joined to the left foot placement surface 711.

The left foot rest 71 transmits a load inputted thereinto through the left foot placement surface 711 to a left portion 5L of the linkage 5. As shown in FIG. 3, the left portion 5L of the linkage 5 is a portion of the linkage 5 which is located on the left of the upper intermediate connecting axis and the lower intermediate connecting axis in the left-right direction of the body frame 21.

The right foot placement surface 721 is a portion where the right foot of the rider who rides on the vehicle 1 is placed. The right connector 722 connects the right foot placement surface 721 and the right side member 54 of the linkage 5 together. As shown in FIG. 1, the right connector 722 includes a right front portion 722*a* which extends in the up-down direction of the body frame 21 and a right rear portion 722b which extends in the front-rear direction of the body frame. The right front portion 722a is joined to the right side member 54. The right rear portion 722b is joined to the right foot placement surface 721.

The right foot rest 72 transmits a load inputted thereinto through the right foot placement surface 721 to a right portion 5R of the linkage 5. As shown in FIG. 3, the right portion 5R of the linkage 5 includes a portion of the linkage 5 which is located on the right of the upper intermediate connecting axis and the lower intermediate connecting axis in the left-right direction of the body frame 21.

According to the configuration described above, the leaning of the body frame 21 is controlled by individually controlling the load applied to the left foot placement surface 711 through the left foot of the rider and the load applied to the right foot placement surface 721 through the right foot of the rider.

For example, when the body frame 21 leans to the left of the vehicle 1 as shown in FIG. 5, the left portion 5L of the linkage 5 including a left portion of the upper cross member 51, a left portion of the lower cross member 52 and the left side member 53 is displaced to a position above the right portion 5R of the linkage 5 including a right portion of the upper cross member 51, a right portion of the lower cross member 52 and the right side member 54 in the up-down direction of the body frame 21. As this occurs, when a load is applied to the left portion 5L of the linkage 5 through the left foot placement surface 711 by the left foot of the rider, a force acts to displace the left portion 5L of the linkage 5 downwards, such that the leaning of the body frame 21 to the left of the vehicle 1 is reduced.

On the contrary, when the body frame leans to the right of the vehicle 1, the right portion 5R of the linkage 5 is displaced to a position above the left portion 5L of the linkage 5 in the up-down direction of the body frame 21. As this occurs, when a load is applied to the right portion 5R of the linkage 5 through the right foot placement surface 721 by the right foot of the rider, a force acts to displace the right portion 5R of the linkage 5 downwards in the up-down direction of the body frame 21, such that the leaning of the body frame 21 to the right of the vehicle 1 is reduced.

Since the load is applied directly to the linkage 5 through the foot of the rider, the leaning of the vehicle 1 is controlled without the necessity of providing a complicated mechanism such as an anti-rolling device described in Japanese Patent Publication No. 2005-313876 A. As a result, the leaning of the body frame 21 of the vehicle 1 equipped with the leanable body frame 21 and the two front wheels 3 is controlled with a simpler configuration.

In the above preferred embodiment, the left foot rest 71 is provided on the left side member 53. The left side member 53 is a portion of the left portion 5L of the linkage 5 which is displaced relative to the body frame 21 as the body frame 21 leans while being unable to be displaced relative to the body frame 21 as the steering force transmission 66 is displaced. On the other hand, the right foot rest 72 is provided on the right side member 54. The right side member 54 is a portion of the right portion 5R of the linkage 5 which is displaced relative to the body frame 21 as the body frame 21 leans while being unable to be displaced relative to the body frame 21 as the steering force transmission 66 is displaced.

Namely, as is clear from FIGS. 3 and 4, the left foot placement surface 711 and the right foot placement surface 721 are not displaced in the direction in which the steering member 65 turns when the vehicle 1 is operated to be steered. In other words, as shown in FIG. 5, the left foot placement surface 711 and the right foot placement surface 721 are able to move only in the up-down direction of the body frame 21 and in the directions in which the body frame 21 is caused to lean. Consequently, by providing a mechanism which controls the leaning of the body frame 21, the enlargement in the size of the vehicle 1 is reduced or prevented.

Further, as is clear from FIG. 5, a moving range of each of the left side member 53 and the right side member 54 in the left-right direction of the body frame 21 when the vehicle 1 is caused to lean is less than a moving range in the up-down direction of the body frame 21 thereof. Consequently, the enlargement of the moving range of each of the left foot placement surface 711 and the right foot placement surface 721 when the vehicle 1 is caused to lean is reduced particularly in the left-right direction of the body frame 21. This advantageous effect becomes remarkable particularly in a case where the left foot placement surface 711 and the right foot placement surface 721 are located farther away from the turning center of the lower cross member 52.

Figure 6:
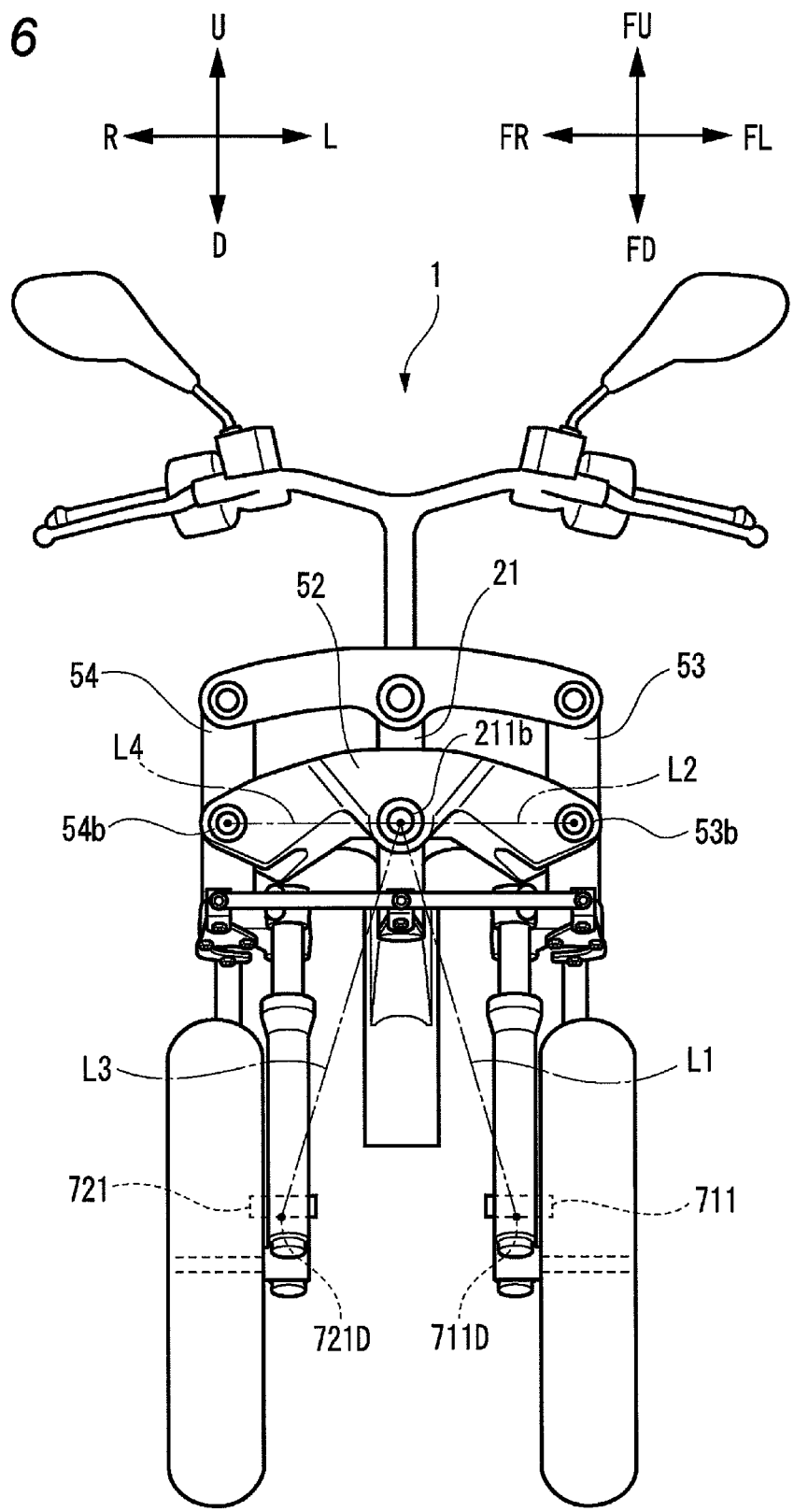
FIG. 6 is a plan view showing the front portion of the vehicle of FIG. 1.

To describe this specifically, as shown in FIG. 6, when the vehicle 1 in which the body frame 21 is standing upright is viewed from the front in the direction along the lower intermediate connecting axis which passes through the lower intermediate connector 211b, a distance L1 between the lower intermediate connecting axis and a lower end 711D of the left foot placement surface 711 is longer than a distance L2 between the lower intermediate connecting axis and the lower left intermediate connecting axis which passes through the lower left connector 53b. On the other hand, when the vehicle 1 in which the body frame 21 is standing upright is viewed from the front in the direction along the lower intermediate connecting axis which passes through the lower intermediate connector 211b, a distance L3 between the lower intermediate connecting axis and a lower end 721D of the right foot placement surface 721 is longer than a distance L4 between the lower intermediate connecting axis and the lower right intermediate connecting axis which passes through the lower right connector 54b.

In the present preferred embodiment, the left front portion 712a of the left connector 712 of the left foot rest 71 is integral with the left side member 53. Namely, in the connector, the left side member 53 and the left front portion 712a are not displaced relative to each other. On the other hand, the right front portion 722a of the right connector 722 of the right foot rest 72 is integral with the right side member 54. Namely, in the connector, the right side member 54 and the right front portion 722a are not displaced relative to each other.

According to the configuration described above, the structure that controls the leaning of the body frame 21 of the vehicle 1 equipped with the leanable body frame 21 and the two front wheels 3 is simple.

In the present preferred embodiment, as shown in FIGS. 5 and 6, the left foot placement surface 711 is disposed below the left side member 53 in the up-down direction of the body frame 21. On the other hand, the right foot placement surfaces 721 is disposed below the right side member 54 in the up-down direction of the body frame 21.

According to the configuration described above, the rider easily places his or her left foot and right foot on the left foot placement surface 711 and the right foot placement surface 721, respectively. Thus, the rider is able to mount and dismount from the vehicle 1 easily as well as the rider obtains a good operation feeling.

As shown in FIG. 3, the left foot placement surface 711 is disposed behind a rear end 31B of the left front wheel 31 in the front-rear direction of the body frame 21. On the other hand, the right foot placement surface 721 is disposed behind a rear end 32B of the right front wheel 32 in the front-rear direction of the body frame 21.

According to the configuration described above, when the vehicle 1 is steered or is caused to lean, the interference of the left foot placement surface 711 with the left front wheel 31 is easily avoided, as well as the interference of the right foot placement surface 721 with the right front wheel 32 is also avoided easily.

Figure 7:
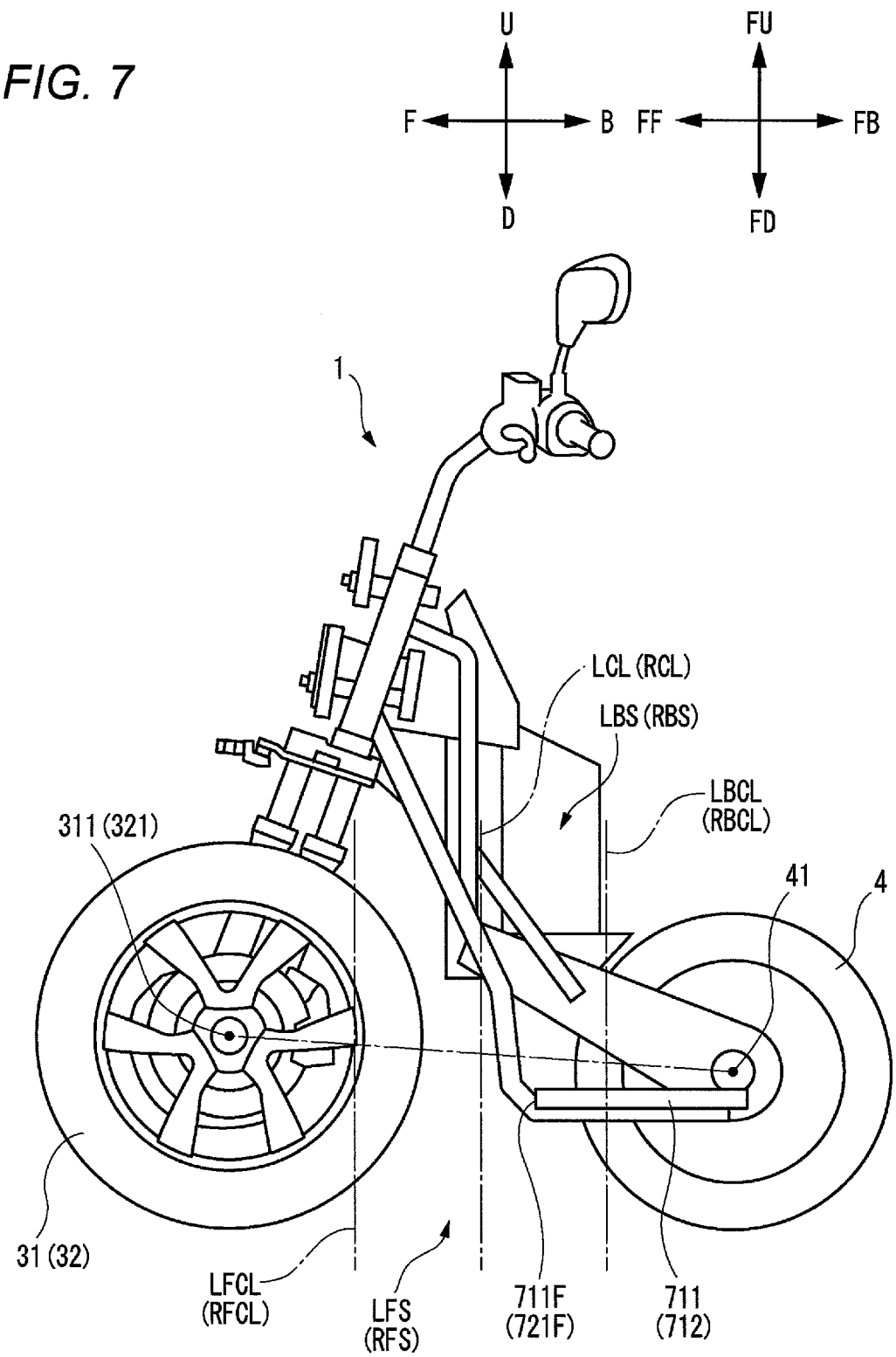
FIG. 7 is a left side view entirely showing the vehicle of FIG. 1.

In the present preferred embodiment, as shown in FIG. 7, a front end 711F of the left foot placement surface 711 is disposed in a left rear section LBS when the vehicle 1 in which the body frame 21 is standing upright is viewed from the left in the left-right direction of the body frame 21. The left rear section LBS is defined by a left central line LCL which extends in the up-down direction of the body frame 21 to contain a left central point which is located at a center between an axle shaft 311 of the left front wheel 31 and an axle shaft 41 of the rear wheel 4 in the front-rear direction of the body frame 21; and a left rear central line LBCL which extends in the up-down direction of the body frame 21 to pass through a left rear central point which is located at a center between the left central point and the axle shaft 41 of the rear wheel 4 in the front-rear direction of the body frame 21.

The front end 711F of the left foot placement surface 711 is disposed in a left front section LFS when the vehicle 1 in which the body frame 21 is standing upright is viewed from the left in the left-right direction of the body frame 21. The left front section LFS is defined by the left central line LCL and a left front central line LFCL which extends in the up-down direction of the body frame 21 to pass through a left front central point which is located at a center between the left central point and the axle shaft 311 of the left front wheel 31 in the front-rear direction of the body frame 21.

On the other hand, a front end 721F of the right foot placement surface 721 is disposed in a right rear section RBS when the vehicle 1 in which the body frame 21 is standing upright is viewed from the right in the left-right direction of the body frame 21. The right rear section RBS is defined by a right central line RCL which extends in the up-down direction of the body frame 21 to contain a right central point which is located at a center between an axle shaft 321 of the right front wheel 32 and the axle shaft 41 of the rear wheel 4 in the front-rear direction of the body frame 21; and a right rear central line RBCL which extends in the up-down direction of the body frame 21 to pass through a right rear central point which is located at a center between the right central point and the axle shaft 41 of the rear wheel 4 in the front-rear direction of the body frame 21.

The front end 721F of the right foot placement surface 721 is disposed in a right front section RFS when the vehicle 1 in which the body frame 21 is standing upright is viewed from the right in the left-right direction of the body frame 21. The right front section RFS is defined by the right central line RCL and a right front central line RFCL which extends in the up-down direction of the body frame 21 to pass through a right front central point which is located at a center between the right central point and the axle shaft 321 of the right front wheel 32 in the front-rear direction of the body frame 21.

Since the vehicle includes the two front wheels 3 and the linkage 5, the center of gravity of the body is located relatively forward. In the event that the left foot placement surface 711 and the right foot placement surface 721 are respectively disposed ahead of the left front section LFS and the right front section RFS, the center of gravity of the body is located further forward. On the other hand, in the event that the left foot placement surface 711 and the right foot placement surface 721 are respectively disposed behind the left rear section LBS and the right rear section RBS, loads applied through the left foot and the right foot of the rider are difficult to be transmitted to the linkage 5. According to the configuration described above, not only the center of gravity of the vehicle in operation is located in a proper position but also the loads are applied easily.

In the present preferred embodiment, as shown in FIG. 3, the power unit 22 is disposed behind the linkage 5 in the front-rear direction of the body frame 21. The left foot placement surface 711 is disposed on the left of a left end 22L of the power unit 22 in the left-right direction of the body frame 21. The right foot placement surface 721 is disposed on the right of a right end 22R of the power unit 22 in the left-right direction of the body frame 21.

In order to transmit the loads applied through the left foot and the right foot of the rider to the linkage 5 in an effective manner, the left foot placement surface 711 and the right foot placement surface 721 should be spaced away from each other in the left-right direction of the body frame 21. By disposing the power unit 22 having a relatively large volume in the space defined in the way described above, it is possible to enhance the utilization efficiency of the space.

In the present preferred embodiment, as has been described above, the left shock absorber 61 is connected to the left portion 5L of the linkage 5. The left shock absorber 61 supports the left front wheel 31 and is able to change the length thereof in the up-down direction of the body frame 21. On the other hand, the right shock absorber 62 is connected to the right portion 5R of the linkage 5. The right shock absorber 62 supports the right front wheel 32 and is able to change the length thereof in the up-down direction of the body frame 21.

According to the configuration described above, since the left shock absorber 61 is interposed between the left portion 5L of the linkage 5 where the left foot rest 71 is provided and the left front wheel 31, it is possible to reduce the transmission of vibrations from the left front wheel 31 to the left foot placement surface 711. Similarly, since the right shock absorber 62 is interposed between the right portion 5R of the linkage 5 where the right foot placement surface 721 is provided and the right front wheel 32, it is possible to reduce the transmission of vibration from the right front wheel 32 to the right foot placement surface 721. Consequently, the comfort in riding the vehicle 1 is enhanced.

The preferred embodiments described heretofore are intended to facilitate the understanding of the present invention and is not intended to limit the present invention. It is obvious that the present invention can be modified or improved without departing from the spirit and scope thereof and that their equivalents can also be included in the present invention.

In the preferred embodiments described above, the left foot rest 71 of the load transmission 7 is preferably integral with the left side member 53 of the left portion 5L of the linkage 5. On the other hand, the right foot rest 72 of the load transmission 7 is preferably integral with the right side member 54 of the right portion 5R of the linkage 5. However, the left foot rest 71 and the right foot rest 72 may be provided at other portions of the linkage 5.

Figure 8:
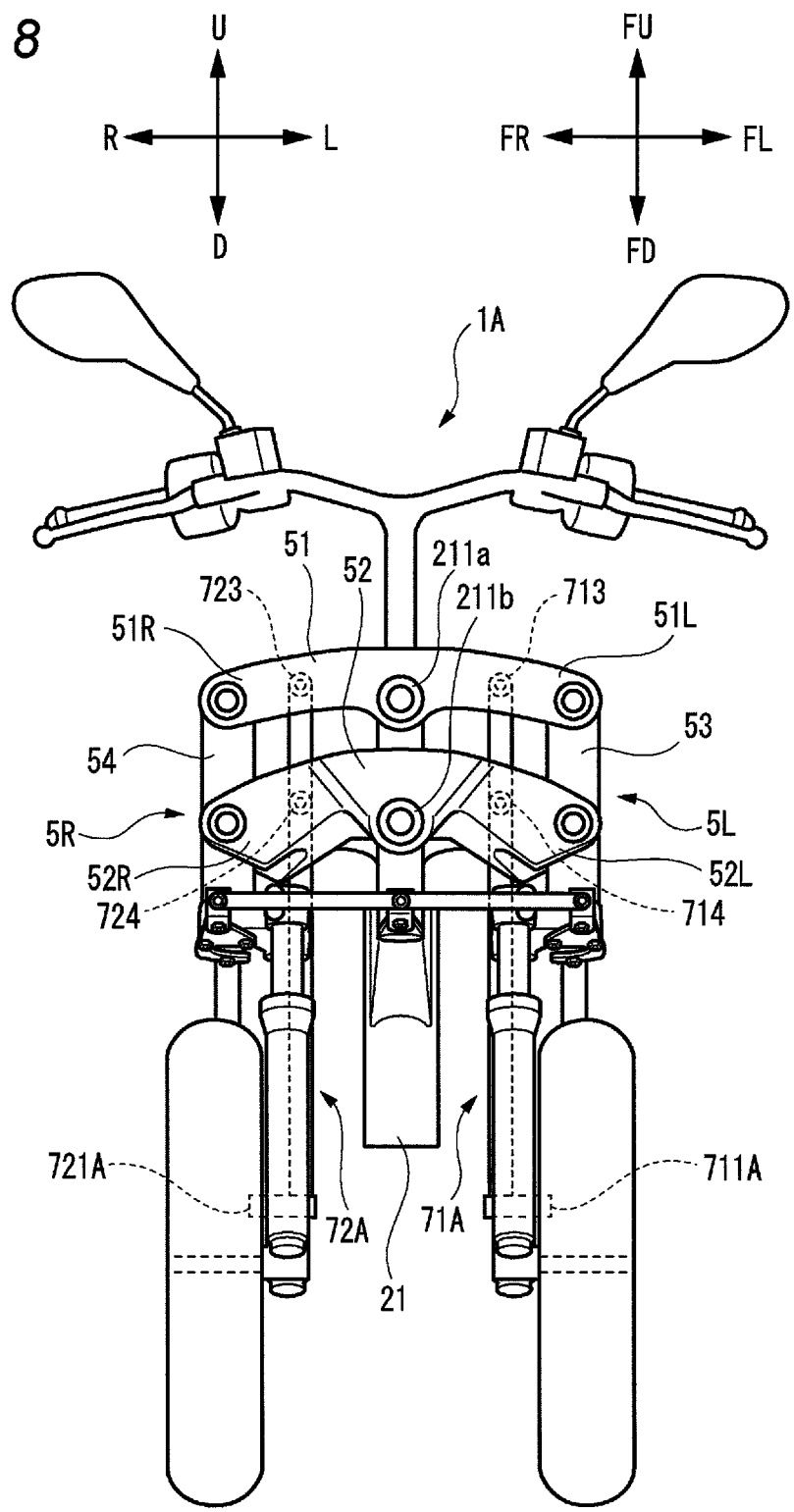
FIG. 8 is a plan view showing a front portion of a vehicle according to a modified preferred embodiment of the present invention.
Figure 9:
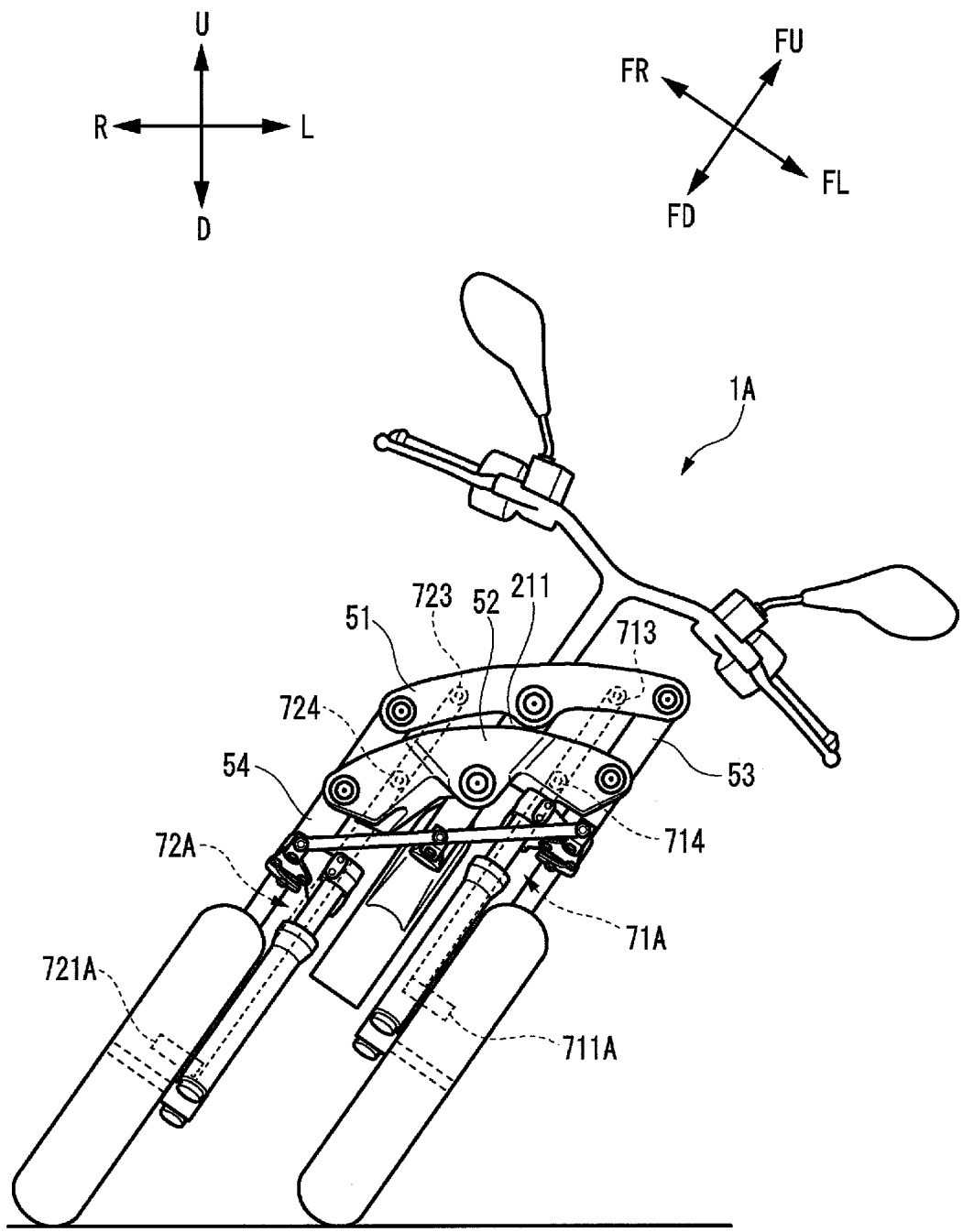
FIG. 9 is a front view showing the front portion of the vehicle of FIG. 8 during leaning.

FIGS. 8 and 9 show a vehicle 1A according to a modified preferred embodiment of the present invention. FIGS. 8 and 9 correspond to FIGS. 2 and 5, respectively. Like reference numerals are given to like constituent elements to those of the vehicle 1 according to the preferred embodiments described above.

A left foot rest 71A according to this modified preferred embodiment includes an upper left connector 713 and a lower left connector 714. The upper left connector 713 is connected to a left portion 51L of an upper cross member 51 in a left portion 5L of a linkage 5. The lower left connector 714 is connected to a left portion 52L of a lower cross member 52 in the left portion 5L of a linkage 5. The upper left connector 713 is able to turn about a left turning axis which extends parallel to an upper intermediate connecting axis which passes through an upper intermediate connector 211a. The lower left connector 714 is able to turn about a left turning axis which extends parallel to a lower intermediate connecting axis which passes through a lower intermediate connector 211b.

On the other hand, a right foot rest 72A according to this modified preferred embodiment includes an upper right connector 723 and a lower right connector 724. The upper right connector 723 is connected to a right portion 51R of the upper cross member 51 in a right portion 5R of the linkage 5. The lower right connector 724 is connected to a right portion 52R of the lower cross member 52 in the right portion 5R of the linkage 5. The upper right connector 723 is able to turn about a right turning axis which extends parallel to the upper intermediate connecting axis which passes through the upper intermediate connector 211a. The lower right connector 724 is able to turn about a right turning axis which extends parallel to the lower intermediate connecting axis which passes through the lower intermediate connector 211b.

According to the configuration described above, as shown in FIG. 9, when the vehicle 1A is caused to lean, the left foot rest 71A turns relative to the upper cross member 51 and the lower cross member 52 while maintaining its posture which is parallel or substantially parallel to a left side member 53. Although these members are necessary to achieve the turning operations, by disposing the upper left connector 713 and the lower left connector 714 closer to a head pipe 211 than the left side member 53, the enlargement of the moving range of the left foot placement surface 711A when the vehicle 1A is caused to lean is further reduced.

On the other hand, the right foot rest 72A turns relative to the upper cross member 51 and the lower cross member 52 while maintaining its posture which is parallel or substantially parallel to a right side member 54. Although these members are necessary to achieve the turning operations, by disposing the upper right connector 723 and the lower right connector 724 closer to the head pipe 211 than the right side member 54, the enlargement of the moving range of the right foot placement surface 721A when the vehicle 1A is caused to lean is further reduced.

The left foot rest 71A including the upper left connector 713 and the lower left connector 714 which are able to move in the ways described above may be provided on the left side member 53 of the linkage 5. On the other hand, the right foot rest 72A including the upper right connector 723 and the lower right connector 724 which are able to move in the ways described above may be provided on the right side member 54 of the linkage 5.

In addition, a configuration may be used in which the left foot rest 71 is integral with the left portion 51L of the upper cross member 51 and the left portion 52L of the lower cross member 52. On the other hand, a configuration may be used in which the right foot rest 72 is integral with the right portion 51R of the upper cross member 51 and the right portion 52R of the lower cross member 52.

In the preferred embodiments described above, the load transmission 7 preferably transmits the load inputted into the left foot placement surface 711 through the left foot of the rider to the left portion 5L of the linkage 5 and that the load inputted into the right foot placement surface 721 through the right foot of the rider is inputted into the right portion 5R of the linkage 5. However, when the load transmission 7 includes an appropriate linkage, a configuration may be used in which the load inputted into the left foot placement surface 711 through the left foot of the rider is transmitted to the right portion 5R of the linkage 5 and the load inputted into the right foot placement surface 721 through the right foot of the rider is inputted into the left portion 5L of the linkage 5.

In the preferred embodiments described above, the linkage 5 preferably includes the upper cross member 51 and the lower cross member 52. However, a configuration may be used in which the linkage 5 includes a cross member other than the upper cross member 51 and the lower cross member 52. The "upper cross member" and the "lower cross member" are merely so called based on their relative positional relationship in the up-down direction. The upper cross member does not mean an uppermost cross member in the linkage 5. The upper cross member includes a cross member which is located above another cross member which is located therebelow. The lower cross member does not mean a lowermost cross member in the linkage 5. The lower cross member includes a cross member which is located below another cross member which is located thereabove.

In the preferred embodiments described above, the upper cross member 51 preferably includes a single plate-shaped member, and the lower cross member 52 preferably includes the front element 521 and the rear element 522. However, a configuration may be used in which the upper cross member 51 includes a front element and a rear element. Additionally, a configuration may be used in which the lower cross member 52 includes a single plate-shaped member. A configuration may be used in which at least one of the upper cross member 51 and the lower cross member 52 includes a left plate-shaped member which is supported on the head pipe 211 and the left side member 53; and a right plate-shaped member which is supported on the head pipe 211 and the right side member 54.

In the preferred embodiments described above, the handlebar 651 is preferably a single member which extends in the left-right direction of the body frame. However, a configuration may be used in which the handlebar 651 includes a left handlebar portion operated by the left hand of the rider and a right handlebar portion operated by the right hand of the rider which are provided as individual separate members, as long as the steering force to turn the left front wheel 31 and the right front wheel 32 is able to be inputted through the handlebar 651.

In the preferred embodiments described above, the linkage 5 is preferably supported on the head pipe 211 which is an example of a link support. However, a configuration may be used in which the linkage 5 is supported on a portion of the body frame 21 other than the head pipe 211 which supports the steering shaft 652.

In the preferred embodiments described above, the steering force transmission 66 includes the intermediate transmission plate 663, the left transmission plate 664, the right transmission plate 665, the intermediate joint 666, the left joint 667, the right joint 668, and the tie rod 669. However, as long as the steering force inputted from the handlebar 651 is able to be transmitted to the left front wheel 31 and the right front wheel 32 by way of the tie rod 669, the intermediate transmission plate 663, the left transmission plate 664, the right transmission plate 665, the intermediate joint 666, the left joint 667 and the right joint 668 may be replaced by appropriate mechanisms such as universal joints.

The terms and expressions that are used in this description are used to describe the preferred embodiments of the present invention and hence should not be construed as limiting the scope of the present invention. It should be understood that any equivalents to the characteristic matters that are shown and described in this description should not be excluded and that various modifications made within the scope of claims to be made later are permitted.

When used in this description, the word "parallel" means that two straight lines which do not intersect each other as members while they are inclined at an angle falling within the range of ±40 degrees are included therein. When used in this description to depict directions and members, the expression reading "along a certain direction" means that a case where something inclines at an angle falling within the range of ±40 degrees relative to the certain direction is included therein. When used in this description, the expression reading "something extends in a certain direction" means that a case where something extends while being inclined at an angle falling within the range of ±40 degrees relative to the certain direction is included therein.

When used in this description, the expression "displace along" means displacement in a direction coincident with or parallel to a reference direction. When the expression "displace along" is used in this description in connection with the direction of an arc motion, it means displacement along any arc that is concentric with a center of curvature of a reference arc.

When used in this description, the expression "so as not to be movable relative to the body frame 21" means that a certain portion or member is caused to lean in the left-right direction of the vehicle 1 together with the body frame 21 when the body frame 21 is caused to lean in the left-right direction of the vehicle 1. When used in this description, the expression "so as not to be movable relative to the body frame 21" may include not only a case where a certain portion or member is directly fixed to the body frame but also a case where the certain portion or member is fixed to a vehicle component (a fuel tank, a bracket, the power unit 22, etc.) which is fixed on the body frame 21. Here the term "fixed" may include a case that a certain portion or member is fixed by way of a damping member or the like.

The present invention can be implemented with many different preferred embodiments. This description should be understood to provide preferred embodiments of the present invention. The preferred embodiments which are least described or illustrated in this description are so described or illustrated based on the understanding that the preferred embodiments are not intended to limit the present invention.

The present invention includes every preferred embodiment which includes an equivalent element, a modification, a deletion, a combination (for example, a combination of characteristics of various preferred embodiments), an improvement and an alteration which can be recognized by those skilled in the art to which the present invention pertains based on the preferred embodiments disclosed in this description. The limitative matters of the claims should be construed broadly based on terms used in the claims and hence should not be limited by the preferred embodiments described in this specification or the prosecution of this patent application. Those preferred embodiments should be construed as non-exclusive. For example, in this description, the terms "preferable" and "may" should be construed as being non-exclusive, and those terms mean, respectively, that it is "preferable but not limited thereto" and that it "may be acceptable but not limited thereto."

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   a body frame;
   a left front wheel and a right front wheel that are side by side in a left-right direction of the body frame;
   a linkage disposed above the left front wheel and the right front wheel in an up-down direction of the body frame, and including an upper cross member, a lower cross member, a left side member, and a right side member that are connected with each other such that the upper cross member and the lower cross member maintain their postures parallel to each other while the left side member and the right side member maintain their postures parallel to each other, and change positions of the left front wheel and the right front wheel relative to the body frame to cause the body frame to lean to left or right of the vehicle;
   a left front wheel support connected to the linkage and supporting the left front wheel;
   a right front wheel support connected to the linkage and supporting the right front wheel; and
   a load transmission including a left foot placement surface on which a left foot of a driver riding the vehicle is to be placed and a right foot placement surface on which a right foot of the driver is to be placed, that transmits a load to a left portion of the linkage by way of one of the left foot placement surface and the right foot placement surface, and that transmits a load to a right portion of the linkage by way of the other one of the left foot placement surface and the right foot placement surface.

2. The vehicle according to claim 1, further comprising:
   a steering member that is turnable about a turning axis relative to the body frame; and
   a steering force transmission connecting the left front wheel support and the right front wheel support, and that causes the left front wheel and the right front wheel to turn in a direction that the steering member is turned; wherein
   the load transmission includes:
     a left foot placement portion including the left foot placement surface and located in a portion of the left portion of the linkage that is able to be displaced relative to the body frame in accordance with leaning of the body frame but is not able to be displaced relative to the body frame in accordance with a steering motion of the steering force transmission; and
     a right foot placement portion including the right foot placement surface and located in a portion of the right portion of the linkage that is able to be displaced relative to the body frame in accordance with leaning of the body frame but is not able to be displaced relative to the body frame in accordance with the steering motion of the steering force transmission.

3. The vehicle according to claim 2, wherein the upper cross member is connected to the body frame so as to be turnable about an upper intermediate connecting axis;
the lower cross member is connected to the body frame so as to be turnable about a lower intermediate connecting axis;
a left portion of the upper cross member is connected to an upper portion of the left side member so as to be turnable about an upper left connecting axis;
a right portion of the upper cross member is connected to an upper portion of the right side member so as to be turnable about an upper right connecting axis;
a left portion of the lower cross member is connected to a lower portion of the left side member so as to be turnable about a lower left connecting axis;
a right portion of the lower cross member is connected to a lower portion of the right side member so as to be turnable about a lower right connecting axis;
a portion of the lower cross member that is positioned directly above the lower intermediate connecting axis overlaps the upper cross member, as viewed from a front of the vehicle in a direction along the lower intermediate connecting axis;
the left front wheel support is connected to the left side member so as to be turnable in accordance with the steering motion of the steering force transmission;
the right front wheel support is connected to the right side member so as to be turnable in accordance with the steering motion of the steering force transmission;
the left foot placement portion is located on the left side member; and
the right foot placement portion is located on the right side member.

4. The vehicle according to claim 3, wherein the left foot placement portion is integral with the left side member, and the right foot placement portion is integral with the right side member.

5. The vehicle according to claim 3, wherein a distance between the lower intermediate connecting axis and a lower end of the left foot placement surface is longer than a distance between the lower intermediate connecting axis and the lower left connecting axis, when the body frame is in an upright state and the vehicle is viewed from the front in the direction along the lower intermediate connecting axis; and
a distance between the lower intermediate connecting axis and a lower end of the right foot placement surface is longer than a distance between the lower intermediate connecting axis and the lower right connecting axis, when the body frame is in the upright state and the vehicle is viewed from the front in the direction along the lower intermediate connecting axis.

6. The vehicle according to claim 2, wherein the upper cross member is connected to the body frame so as to be turnable about the upper intermediate connecting axis;
the lower cross member is connected to the body frame so as to be turnable about the lower intermediate connecting axis;
the left foot placement portion includes:
an upper left connector connected to the left portion of the upper cross member so as to be turnable about an upper left turning axis extending in a direction parallel to the upper intermediate connecting axis; and
a lower left connector connected to the left portion of the lower cross member so as to be turnable about a lower left turning axis extending in a direction parallel to the lower intermediate connecting axis;

the right foot placement portion includes:
an upper right connector connected to the right portion of the upper cross member so as to be turnable about an upper right turning axis extending in the direction parallel to the upper intermediate connecting axis; and
a lower right connector connected to the right portion of the lower cross member so as to be turnable about a lower right turning axis extending in the direction parallel to the lower intermediate connecting axis.

7. The vehicle according to claim 1, wherein the left foot placement surface is disposed below the left side member in the up-down direction of the body frame, and the right foot placement surface is disposed below the right side member in the up-down direction of the body frame.

8. The vehicle according to claim 1, wherein the left foot placement surface is disposed behind a rear end of the left front wheel in a front-rear direction of the body frame, and the right foot placement surface is disposed behind a rear end of the right front wheel in the front-rear direction of the body frame.

9. The vehicle according to claim 8, further comprising:
a rear wheel; wherein
a front end of the left foot placement surface is located in either one of a left front section and a left rear section, when the body frame is in an upright state and the vehicle is viewed from a left in a left-right direction of the body frame;
the left front section is defined by:
a left central line extending in the up-down direction of the body frame and including a left central point located at a center between an axle of the left front wheel and an axle of the rear wheel in the front-rear direction of the body frame; and
a left front central line extending in the up-down direction of the body frame and including a left front central point located at a center between the left central point and the axle of the left front wheel in the front-rear direction of the body frame;
the left rear section is defined by the left central line and a left rear central line extending in the up-down direction of the body frame including a left rear central point located at a center between the left central point and the axle of the rear wheel in the front-rear direction of the body frame;
a front end of the right foot placement surface is located in either one of a right front section and a right rear section, when the body frame is in the upright state and the vehicle is viewed from a right in the left-right direction of the body frame;
the right front section is defined by:
a right central line extending in the up-down direction of the body frame and including a right central point located at a center between an axle of the right front wheel and the axle of the rear wheel in the front-rear direction of the body frame; and
a right front central line extending in the up-down direction of the body frame and including a right front central point located at a center between the right central point and the axle of the right front wheel in the front-rear direction of the body frame; and
the right rear section is defined by the right central line and a right rear central line extending in the up-down direction of the body frame and including a right rear central point located at a center between the right central point and the axle of the rear wheel in the front-rear direction of the body frame.

10. The vehicle according to claim 8, further comprising a driving power source disposed behind the linkage in the front-rear direction of the body frame and that supplies driving power for the vehicle; wherein
   the left foot placement surface is disposed on the left of a left end of the driving power source in the left-right direction of the body frame; and
   the right foot placement surface is disposed on the right of a right end of the driving power source in the left-right direction of the body frame.

11. The vehicle according to claim 2, wherein the left front wheel support includes a left shock absorber connected to the left portion of the linkage so as to be able to change a length thereof in the up-down direction of the body frame; and
   the right front wheel support includes a right shock absorber connected to the right portion of the linkage so as to be able to change a length thereof in the up-down direction of the body frame.

* * * * *